United States Patent
Lackner

(10) Patent No.: US 12,084,370 B2
(45) Date of Patent: Sep. 10, 2024

(54) SYSTEM AND METHOD OF WATER REJUVENATION FOR THE REGENERATION OF SORBENT FILTERS

(71) Applicant: ARIZONA BOARD OF REGENTS ON BEHALF OF ARIZONA STATE UNIVERSITY, Scottsdale, AZ (US)

(72) Inventor: Klaus Lackner, Paradise Valley, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 486 days.

(21) Appl. No.: 17/428,966

(22) PCT Filed: Feb. 5, 2020

(86) PCT No.: PCT/US2020/016886
§ 371 (c)(1),
(2) Date: Aug. 5, 2021

(87) PCT Pub. No.: WO2020/163533
PCT Pub. Date: Aug. 13, 2020

(65) Prior Publication Data
US 2022/0119295 A1    Apr. 21, 2022

Related U.S. Application Data

(60) Provisional application No. 62/801,373, filed on Feb. 5, 2019.

(51) Int. Cl.
C02F 9/00    (2023.01)
C02F 1/42    (2023.01)
(Continued)

(52) U.S. Cl.
CPC .......... C02F 9/00 (2013.01); C02F 1/42 (2013.01); C02F 5/02 (2013.01);
(Continued)

(58) Field of Classification Search
CPC ...... C02F 9/00; C02F 1/42; C02F 5/02; C02F 1/441; C02F 2001/422; C02F 2001/425; C02F 2209/06
(Continued)

(56) References Cited

U.S. PATENT DOCUMENTS 5,348,588 A * 9/1994 Winston .................. C23G 1/36
159/24.2
5,776,340 A    7/1998 Jangbarwala et al.
(Continued)

FOREIGN PATENT DOCUMENTS

CN    102730796 A  * 10/2012
CN    110067610 A  *  7/2019
(Continued)

OTHER PUBLICATIONS

Machine-generated English translation of CN 110067610, generated on Dec. 20, 2023.*
(Continued)

Primary Examiner — Fred Prince
(74) Attorney, Agent, or Firm — BOOTH UDALL FULLER, PLC

(57) ABSTRACT

A system for water rejuvenation for the regeneration of sorbent filters is disclosed. The system includes an anion reduction subsystem having a plurality of anionic exchange resin beds configured to remove impurity anions from a wash water used in a moisture-swing, direct-air-capture device. Each resin beds is in a vessel inside of which is configured to perform at least one of three operations: (1) conditioning resin beds by flushing them with carbonate or
(Continued)

bicarbonate, (2) upgrading the wash water by removing impurity anions from the wash water reservoir, and (3) cleaning input water by exchanging impurity anions for carbonate or bicarbonate ions in the input feed. Each vessel cycles through these operations in the order (1), (2), (3). The system also includes a cation reduction subsystem that reduces the salinity of the wash water, and a divalent reduction subsystem that softens the wash water by removing divalent ions.

20 Claims, 12 Drawing Sheets

(51) Int. Cl.
*C02F 1/44* (2023.01)
*C02F 5/02* (2023.01)

(52) U.S. Cl.
CPC .. *C02F 2001/422* (2013.01); *C02F 2001/425* (2013.01); *C02F 1/441* (2013.01); *C02F 2209/06* (2013.01)

(58) Field of Classification Search
USPC ....... 210/660, 661, 663, 670, 673, 652, 175, 210/259
See application file for complete search history.

(56) References Cited

U.S. PATENT DOCUMENTS

| 5,951,874 | A | 9/1999 | Jangbarwala et al. |
| 6,296,761 | B1 | 10/2001 | Scheuerman, III |
| 9,616,375 | B2 | 4/2017 | Wright et al. |
| 2010/0095842 | A1 | 4/2010 | Lackner et al. |
| 2018/0273401 | A1* | 9/2018 | SenGupta ................ B01J 39/07 |

FOREIGN PATENT DOCUMENTS

| EP | 0659483 A2 * | 6/1995 |
| WO | WO 2014/104248 A1 * | 7/2014 |
| WO | WO 2016/012815 A1 * | 1/2016 |

OTHER PUBLICATIONS

Machine-generated English translation of WO 2014/104248, generated on Dec. 20, 2023.*
Machine-generated English translation of CN 102730796, generated on Dec. 20, 2023.*

* cited by examiner

SYSTEM AND METHOD OF WATER REJUVENATION FOR THE REGENERATION OF SORBENT FILTERS

RELATED APPLICATIONS

This application is the U.S. National Stage of International Application No. PCT/US2020/016886, filed Feb. 5, 2020, which claims priority to and the benefit of U.S. provisional patent application 62/801,373, filed Feb. 5, 2019 titled "System and Method of Water Rejuvenation for the Regeneration of Sorbent Filters," the contents of each of which are hereby incorporated by reference in their entireties.

TECHNICAL FIELD

Aspects of this document relate generally to water rejuvenation for use with sorbent filters.

BACKGROUND

The need for technologies to remove carbon dioxide from ambient air has been well established. Nevertheless, the capture technologies are still new and still possess weaknesses particular to each method of carbon dioxide capture. Direct air capture (DAC) systems relying on moisture swing sorbents have been shown to be cost effective and energy efficient. The anionic exchange resins performing the moisture swing bind carbon dioxide when dry and release it again when wet. Air capture is performed by exposing filters containing these resins to ambient air. The air dries the resin while delivering carbon dioxide for absorption. In the regeneration cycle the resin is exposed to moisture. One way of applying moisture is to submerge the ion exchange resin in water, another is to expose it to water vapor. High humidity levels and elevated temperatures combine to drive the carbon dioxide off the resin.

However, even moisture swing DAC systems have weaknesses. For the resin to be active, the anions present should be dominated by hydroxide, carbonate, and bicarbonate ion. Chlorides, sulfates or other ions are inactive, and their presence would unnecessarily limit the uptake capacity of the resin. It is therefore important that resins are not converted accidentally to hold other anions, and thus deactivate. The advantage of delivering water as vapor or condensate is that the water touching the resin is free of other anions, and thereby introduces little opportunity for deactivating the resin. The advantage of liquid water is that it can accelerate the regeneration process. A major challenge for the liquid water approach is to minimize the substitution of hydroxide and dissolved inorganic carbon anions with other anions, for example chlorides or sulfates.

Whether using liquid water or water vapor, the system will lose water to evaporation. As the water evaporates, the concentration of the various substances left behind increases over time, eventually interfering with the operation of the resins. The gradual increase in salinity, chloride and sulfate ions, and other dissolved solids needs to be managed for efficient long-term operation of the DAC.

Furthermore, one of the advantages of DAC systems using moisture swing resins is that they can be operated using readily available water sources, such as ground water, river water, lake water, and the like. While these sources are sufficient to operate the moisture swing, they are not pure. Trying to solve the problem by simply flushing the system with water will have limited effectiveness, and make the system less efficient over all.

SUMMARY

According to one aspect, a system for rejuvenating wash water includes a wash water reservoir including wash water and an anion reduction subsystem in fluid communication with the wash water reservoir and a replacement water source. The anionic reduction subsystem includes at least three anionic beds, each having an anion exchange resin, and at least three vessels, each vessel of the at least three vessels having an interior in fluid communication with at least one fluid source and at least one fluid drain. Each vessel of the at least three vessels further includes an active state of the vessel including a first fluid flowing from one fluid source of the at least one fluid source to the interior of the vessel to flow through one anionic bed of the at least three anionic beds within the interior of the vessel while a second fluid flows from the interior of the vessel to one fluid drain of the at least one fluid drain. The first fluid and second fluid flow at a flow rate greater than zero. The vessel also includes an inactive state of the vessel wherein the flow of the first and second fluids has substantially ceased. The subsystem include a driver coupled to the anion bed of each of the at least three vessels. Each vessel of the at least three vessels is configured to perform at least one operation, each operation of the at least one operation including a first transition of the vessel from the inactive state to the active state, the first transition occurring when the anionic bed positioned within the interior of the vessel has a first anionic composition trapped inside the anion exchange resin of the anionic bed. The operation also includes a second transition of the vessel from the active state to the inactive state, the second transition occurring when a breakthrough condition has been reached for the anionic bed positioned within the interior of the vessel at the first transition after exchanging anions with the first fluid resulting in the anionic bed having a second anionic composition trapped inside the anion exchange resin of the anionic bed. The second anionic composition has a ratio of anions that is substantially equal to the ratio of anions of the first fluid. The system also includes a first and second set of desalination modules, each desalination module including a saline fluid input and a reduced salinity fluid output, each desalination receiving a saline fluid through its saline fluid input, removing excess cations from the saline fluid, and providing a reduced salinity fluid through the reduced salinity fluid output. The reduced salinity fluid has a lower salinity than the saline solution. Each desalination module is one of a purification module that applies reverse osmosis to the saline fluid, generating a purified water that is sent to the reduced salinity fluid output as the reduced salinity fluid, and also generating a concentrated brine, a precipitation module including a cooling mechanism that reduces the temperature of the saline fluid causing the precipitation of an alkali bicarbonate solid from the saline fluid and generating the reduced salinity fluid, and a scavenge module including a cationic bed including a first cation exchange resin that removes excess cations from the saline fluid through cationic exchange to produce the reduced salinity fluid. The scavenge module is configured to regenerate the first cation exchange resin using an acid solution. The system also includes a first cation reduction subsystem including a wash water input and a wash water output, both in fluid communication with the wash water reservoir, and further including the first set of desalination modules. The first set of desalination modules includes a purification module whose saline fluid input is coupled to the wash water input, one of a precipitation module and a scavenge module whose reduced salinity fluid output is coupled to the wash water output, and the other of the precipitation module and the scavenge module whose saline fluid input is coupled to the purification module to receive the concentrated brine. The system includes a second cation reduction subsystem including an external water input in fluid communication with the replacement water source, an anionic output in fluid communication with the anion reduction subsystem, and further including the second set of desalination modules, the second set of desalination modules including a purification module whose saline fluid input is coupled to the external water input, one of a precipitation module and a scavenge module whose reduced salinity fluid output is coupled to the anionic output, and the other of the precipitation module and the scavenge module whose saline fluid input is coupled to the purification module to receive the concentrate brine. The system includes at least one divalent reduction subsystem. Each of the at least one divalent reduction subsystem includes a hard water input in fluid communication with one of the wash water reservoir and the input water source, a soft water output in fluid communication with one of the wash water reservoir and the anion reduction subsystem, and a softening bed including a second cation exchange resin that scavenges divalent ions from a hard water received through the hard water input and produces a soft water that is provided through the soft water output. The anion reduction subsystem is configured to perform a plurality of operations including a conditioning operation performed in one vessel of the at least three vessels. The first fluid is a bicarbonate solution, the fluid source is a bicarbonate solution reservoir, the second fluid is a waste solution including impurity anions, and the fluid drain is a waste tank. The operations also include an upgrading operation performed in one vessel of the at least three vessels. The first fluid is wash water, the fluid source is the wash water reservoir, the second fluid is an upgraded wash water having a lower concentration of impurity anions than the first fluid, and the fluid drain is the wash water reservoir. The operations also includes a cleaning operation performed in one vessel of the at least three vessels. The first fluid is input water, the fluid source is the replacement water source, the second fluid is a cleansed input water having a lower concentration of impurity anions than the first fluid, and the fluid drain is the wash water reservoir. The second anionic composition of the conditioning operation is the first anionic composition of the upgrading operation, the second anionic composition of the upgrading operation is the first anionic composition of the cleaning operation, and the second anionic composition of the cleaning operation is the first anionic composition of the conditioning operation. The anion reduction subsystem is further configured to operate cyclically, with a cycle including a conditioning operation, a cleaning operation, and an upgrading operation. For at least a majority of the cycle, the upgrading operation is performed in a first vessel of the three vessels while the cleaning operation is performed in a second vessel of the three vessels and the conditioning operation is performed in a third vessel of the three vessels. Upon completion of the cycle, the driver moves the three anionic beds, shifting the anionic bed of the first vessel to the interior of the second vessel, the anionic bed of the second vessel to the interior of the third vessel, and the anionic bed of the third vessel to the interior of the first vessel. The second cation exchange resin is regenerated using an alkali bicarbonate solution, creating a waste solution. The wash water moves through the first cation reduction subsystem at a first desalination flow rate, exiting through the wash water output having a lower salinity than the wash water entering through the wash water input. The input water moves through the second cation reduction subsystem at a second desalination flow rate, exiting through the anionic output having a lower salinity than the input water entering through the external water input.

According to another aspect of the disclosure, a system for rejuvenating wash water includes a wash water reservoir including wash water, and an anion reduction subsystem in fluid communication with the wash water reservoir and a replacement water source. The anionic reduction subsystem includes at least one anionic bed, each having an anion exchange resin, and at least one vessel. Each vessel of the at least one vessel has an interior in fluid communication with at least one fluid source and at least one fluid drain. Each vessel of the at least one vessel further includes an active state of the vessel including a first fluid flowing from one fluid source of the at least one fluid source to the interior of the vessel to flow through one anionic bed of the at least one anionic bed within the interior of the vessel while a second fluid flows from the interior of the vessel to one fluid drain of the at least one fluid drain, the first fluid and second fluid flowing at a flow rate greater than zero, and an inactive state of the vessel wherein the flow of the first and second fluids has substantially ceased. Each vessel of the at least one vessel is configured to perform at least one operation, each operation of the at least one operation including a first transition of the vessel from the inactive state to the active state, the first transition occurring when the anionic bed positioned within the interior of the vessel has a first anionic composition trapped inside the anion exchange resin of the anionic bed, and a second transition of the vessel from the active state to the inactive state, the second transition occurring when a breakthrough condition has been reached for the anionic bed positioned within the interior of the vessel at the first transition after exchanging anions with the first fluid resulting in the anionic bed having a second anionic composition trapped inside the anion exchange resin of the anionic bed. The second anionic composition has a ratio of anions that is substantially equal to the ratio of anions of the first fluid. The anion reduction subsystem is configured to perform a plurality of operations including a conditioning operation performed in one vessel of the at least one vessel. The first fluid is a bicarbonate solution, the fluid source is a bicarbonate solution reservoir, the second fluid is a waste solution including impurity anions, and the fluid drain is a waste tank. The operations also include an upgrading operation performed in one vessel of the at least one vessel. The first fluid is wash water, the fluid source is the wash water reservoir, the second fluid is an upgraded wash water having a lower concentration of impurity anions than the first fluid, and the fluid drain is the wash water reservoir. The operations also include a cleaning operation performed in one vessel of the at least one vessel, QQ the first fluid is input water, the fluid source is the replacement water source, the second fluid is a cleansed input water having a lower concentration of impurity anions than the first fluid, and the fluid drain is the wash water reservoir. The second anionic composition of the conditioning operation is the first anionic composition of the upgrading operation, the second anionic composition of the upgrading operation is the first anionic composition of the cleaning operation, and the second anionic composition of the cleaning operation is the first anionic composition of the conditioning operation. The anion reduction subsystem is further configured to operate cyclically, with a cycle including a conditioning operation, a cleaning operation, and an upgrading operation.

Particular embodiments may comprise one or more of the following features. The at least one vessel may be a single vessel. The conditioning, upgrading, and cleaning operations may be performed sequentially during the cycle. The anion reduction subsystem may further include a driver coupled to the anion bed of each of the at least one vessel. The at least one vessel may be two vessels and the at least one anionic bed may be two anionic beds. For each cycle, the upgrading operation may be performed in a first vessel of the two vessels and the cleaning and conditioning operations may be performed sequentially in a second vessel of the two vessels. Upon completion of the cycle, the driver may move the anionic bed of the first vessel to the interior of the second vessel and the anionic bed of the second vessel to the interior of the first vessel. The anion reduction subsystem may further include a driver coupled to the anion bed of each of the at least one vessel. The at least one vessel may be three vessels and the at least one anionic bed may be three anionic beds. For at least a majority of the cycle, the upgrading operation may be performed in a first vessel of the three vessels while the cleaning operation may be performed in a second vessel of the three vessels and the conditioning operation may be performed in a third vessel of the three vessels. Upon completion of the cycle, the driver may move the three anionic beds, shifting the anionic bed of the first vessel to the interior of the second vessel, the anionic bed of the second vessel to the interior of the third vessel, and the anionic bed of the third vessel to the interior of the first vessel. The flow rate of the active state of each of the three vessels may result in the conditioning, upgrading, and cleaning operations each having a duration that is substantially equal. The cycle may have a duration no greater than a duration of the upgrading operation. Each vessel of the at least one vessel may further include a breakthrough sensor configured to detect the breakthrough condition of the at least one operation of the vessel. For each vessel of the at least one vessel, the breakthrough sensor may be a pH sensor configured to measure the pH of the first fluid and the second fluid.

The breakthrough condition may have been reached when the second fluid has a pH substantially equal to a pH of the first fluid. For each vessel of the at least one vessel, the flow through the vessel during the active state may be a plug flow. The input water may be tap water. The flow rate of the vessel performing the cleaning operation is substantially similar to a demand for replacement water in the wash water reservoir. The system may further include a first cation reduction subsystem including a wash water input and a wash water output, both in fluid communication with the wash water reservoir, and may also further include at least one desalination module. Each desalination module may include a saline fluid input and a reduced salinity fluid output. For each desalination module of the at least one desalination module, the saline fluid input may be in fluid communication with one of the wash water reservoir and a different desalination module, and the reduced salinity fluid output may be in fluid communication with one of the saline fluid input of another desalination module and the wash water reservoir. Each desalination module of the at least one desalination module may receive a saline fluid through the saline fluid input of the desalination module, may remove excess cations from the saline fluid, and/or may provide a reduced salinity fluid through the reduced salinity fluid output, the reduced salinity fluid having a lower salinity than the saline solution. Each desalination module of the at least one desalination module may be a different one of a purification module that applies reverse osmosis to the saline fluid, generating a purified water that is sent to the reduced salinity fluid output as the reduced salinity fluid, and also generating a concentrated brine, a precipitation module including a cooling mechanism that reduces the temperature of the saline fluid causing the precipitation of an alkali bicarbonate solid from the saline fluid and generating the reduced salinity fluid, and a scavenge module including a cationic bed including a first cation exchange resin that removes excess cations from the saline fluid through cationic exchange to produce the reduced salinity fluid, the scavenge module configured to regenerate the first cation exchange resin using an acid solution. The wash water may move through the first cation reduction subsystem at a first desalination flow rate, and may exit through the wash water output having a lower salinity than the wash water entering through the wash water input. The system may also include a second cation reduction subsystem including an external water input that may be in fluid communication with the replacement water source, an anionic output that may be in fluid communication with the anion reduction subsystem, and/or further include at least one desalination module. Each desalination module may include a saline fluid input and a reduced salinity fluid output. For each desalination module of the at least one desalination module, the saline fluid input may be in fluid communication with one of the replacement water source and a different desalination module, and the reduced salinity fluid output may be in fluid communication with one of the saline fluid input of another desalination module and the anion reduction subsystem. Each desalination module of the at least one desalination module may receive a saline fluid through the saline fluid input of the desalination module, may remove excess cations from the saline fluid, and/or may provide a reduced salinity fluid through the reduced salinity fluid output. The reduced salinity fluid may have a lower salinity than the saline solution. Each desalination module of the at least one desalination module may be a different one of a purification module that applies reverse osmosis to the saline fluid, generating a purified water that is sent to the reduced salinity fluid output as the reduced salinity fluid, and also generating a concentrated brine, a precipitation module including a cooling mechanism that reduces the temperature of the saline fluid causing the precipitation of an alkali bicarbonate solid from the saline fluid and generating the reduced salinity fluid, and a scavenge module including a cationic bed including a first cation exchange resin that removes excess cations from the saline fluid through cationic exchange to produce the reduced salinity fluid, the scavenge module configured to regenerate the first cation exchange resin using an acid solution. The input water may move through the second cation reduction subsystem at a second desalination flow rate, and may exit through the anionic output having a lower salinity than the input water entering through the external water input. The at least one desalination module may include the purification module whose saline fluid input may be coupled to the wash water input, and may further include one of the precipitation module and the scavenge module. The concentrated brine output by the purification module may be sent to the saline fluid input of the one of the precipitation module and the scavenge module, whose reduced salinity fluid output may be coupled to the wash water output. The at least one desalination module may include the purification module whose saline fluid input may be coupled to the wash water input, one of the precipitation module and the scavenge module whose reduced salinity fluid output may be coupled to the wash water output, and the other of the precipitation module and the scavenge module whose saline fluid input may receive the concentrated brine output by the purification module. The concentrated brine produced by the purification module may be sent to the anion reduction subsystem. The alkali bicarbonate solid produced by the precipitation module maybe used to produce the bicarbonate solution used to regenerate the anion exchange resin of the system. The acid solution used by the scavenge module to regenerate the first cation exchange resin may be a carbonic acid solution produced using pressurized carbon dioxide. The regeneration of the first cation exchange resin using the carbonic acid solution may produce an alkali bicarbonate solution as a byproduct. The alkali bicarbonate solution may be used to regenerate the anion exchange resin of the system. The pressurized carbon dioxide may be provided by a direct air capture device including a moisture swing sorbent regenerated by the wash water of the wash water reservoir. The system may further include at least one additional desalination module in fluid communication with one of the anion reduction subsystem, the wash water reservoir, and/or the replacement water source. The at least one additional desalination module may not be part of the first cation reduction subsystem. The system may further include at least one divalent reduction subsystem. Each of the at least one divalent reduction subsystem may include a hard water input in fluid communication with one of the wash water reservoir and the input water source, a soft water output in fluid communication with one of the wash water reservoir and the anion reduction subsystem, and/or a softening bed including a second cation exchange resin that scavenges divalent ions from a hard water received through the hard water input and produces a soft water that is provided through the soft water output. The second cation exchange resin may be regenerated using an alkali bicarbonate solution, creating a waste solution. Each divalent reduction subsystem of the at least one divalent reduction subsystem may be upstream from any purification module, making the soft water produced by the divalent reduction subsystem the saline fluid with respect to any purification module. The waste solution including a bicarbonate solution may be heated, causing the precipitation of at least one of calcium carbonate and magnesium carbonate. The resulting waste precipitate may be removed from the at least one divalent reduction subsystem.

According to yet another aspect of the disclosure, a method for rejuvenating wash water includes performing an anion reduction cycle within an anion reduction subsystem in fluid communication with a wash water reservoir including wash water and a replacement water source, the anion reduction subsystem including at least one vessel. Each vessel includes an interior containing an anionic bed including an anion exchange resin. The anion reduction cycle includes a conditioning operation, an upgrading operation, and a cleaning operation. Each operation includes receiving a first fluid into one vessel of the at least one vessel at a flow rate, the first fluid flowing through the anionic bed creating a second fluid that flows out of the vessel as the first fluid flows into the vessel, determining if a breakthrough condition has been reached within the vessel, and stopping the flow of the first fluid into the vessel in response to reaching the breakthrough condition.

The conditioning operation includes receiving a bicarbonate solution into one vessel of the at least one vessel, the bicarbonate solution flowing through the anionic bed and regenerating the anion exchange resin of the anionic bed and creating a waste solution including impurity anions, the waste solution flowing out of the vessel as the bicarbonate solution flows into the vessel. The upgrading operation includes receiving wash water from the wash water reservoir into one vessel of the at least one vessel, the wash water flowing through the anionic bed and exchanging impurity anions from the wash water with bicarbonate ions within the anion exchange resin and creating an upgraded wash water having a lower concentration of impurity anions than the wash water, the upgraded wash water flowing from the vessel to the wash water reservoir as the wash water flows into the vessel from the wash water reservoir. The cleaning operation includes receiving input water from the replacement water source into one vessel of the at least one vessel, the input water flowing through the anionic bed and exchanging impurity anions from the input water with bicarbonate ions within the anion exchange resin and creating a cleansed input water having a lower concentration of impurity anions than the input water. The cleansed input water flows from the vessel to the wash water reservoir as the input water flows into the vessel from the replacement water source.

Particular embodiments may comprise one or more of the following features. The anion reduction subsystem may further include a driver coupled to the anion bed of each of the at least one vessel. The at least one vessel may be three vessels. For at least a majority of the cycle, the upgrading operation may be performed in a first vessel of the three vessels while the cleaning operation may be performed in a second vessel of the three vessels and the conditioning operation may be performed in a third vessel of the three vessels. The method may further include moving the three anionic beds with the driver upon completion of the cycle, shifting the anionic bed of the first vessel to the interior of the second vessel, the anionic bed of the second vessel to the interior of the third vessel, and the anionic bed of the third vessel to the interior of the first vessel. The flow rate of each operation may result in the conditioning, upgrading, and cleaning operations each having a duration that may be substantially equal. The cycle may have a duration no greater than a duration of the upgrading operation. Each vessel may further include a breakthrough sensor configured to detect the breakthrough condition. For each vessel, the breakthrough sensor may be a pH sensor configured to measure the pH of the first fluid flowing into the vessel and the second fluid flowing out of the vessel. For each vessel, determining if the breakthrough condition has been reached within the vessel may include measuring the pH of the first fluid, measuring the pH of the second fluid, and/or determining if the pH of the second fluid is substantially equal to the pH of the first fluid. For each vessel of the at least one vessel, the flow through the vessel during each operation may be a plug flow. The method may further include receiving a high salinity wash water from the wash water reservoir at a first desalination rate, and/or reducing the salinity of the high salinity wash water to generate a reduced salinity wash water. The reducing salinity may include at least one of applying reverse osmosis to generate a purified water and a concentrated brine, the purified water being sent to the wash water reservoir and the concentrated brine being one of sent to the anion reduction subsystem and further desalinated, precipitating an alkali bicarbonate solid through temperature reduction, removing excess cations through cationic exchange using a first cation exchange resin, the first cation exchange resin being regenerated using an acid solution, and/or sending the reduced salinity wash water to the wash water reservoir. The method may further include receiving a high salinity input water from the replacement water source at a second desalination rate, and reducing the salinity of the high salinity input water to generate a reduced salinity input water. The reducing salinity may include at least one of applying reverse osmosis to generate a purified water and a concentrated brine, the purified water being sent to the anion reduction subsystem and the concentrated brine being one of sent to the anion reduction subsystem and further desalinated, precipitating an alkali bicarbonate solid through temperature reduction, removing excess cations through cationic exchange using a first cation exchange resin, the first cation exchange resin being regenerated using an acid solution, and/or sending the reduced salinity input water to the anion reduction subsystem. Reducing the salinity may include first applying reverse osmosis, then one of precipitating an alkali bicarbonate solid and removing excess cations, followed by the other of precipitating an alkali bicarbonate solid and removing excess cations. The concentrated brine may be sent to the anion reduction subsystem. The method may further include using the alkali bicarbonate solid produced by precipitation to produce the bicarbonate solution used to regenerate the anion exchange resin of the anion reduction subsystem. The method may further include producing the acid solution used to regenerate the first cation exchange resin using pressurized carbon dioxide. The acid solution may be a carbonic acid solution. The method may further include regenerating the first cation exchange resin using the carbonic acid solution, producing an alkali bicarbonate solution as a byproduct, and using the alkali bicarbonate solution to regenerate the anion exchange resin of the anion reduction subsystem. The pressurized carbon dioxide may be provided by a direct air capture device including a moisture swing sorbent regenerated by the wash water of the wash water reservoir. The method may further include reducing the concentration of divalent cations, said reduction may include receiving an input hard water from one of the wash water reservoir and the input water source, scavenging divalent ions from the hard water using a second cation exchange resin to produce a soft water and a bicarbonate waste solution, and/or sending the soft water to one of the wash water reservoir and the anion reduction subsystem. The method may further include at least one divalent reduction subsystem, each of the at least one divalent reduction subsystem may include a hard water input in fluid communication with one of the wash water reservoir and the input water source, a soft water output in fluid communication with one of the wash water reservoir and the anion reduction subsystem, and/or a softening bed including a second cation exchange resin that scavenges divalent ions from a hard water received through the hard water input and produces a soft water that is provided through the soft water output. The second cation exchange resin may be regenerated using an alkali bicarbonate solution, creating a waste solution. Reducing the concentration of divalent cations may precede any use of reverse osmosis. The method may further include heating the bicarbonate waste solution, causing the precipitation of a waste precipitate including at least one of calcium carbonate and magnesium carbonate, and removing the waste precipitate from the heated bicarbonate waste solution.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
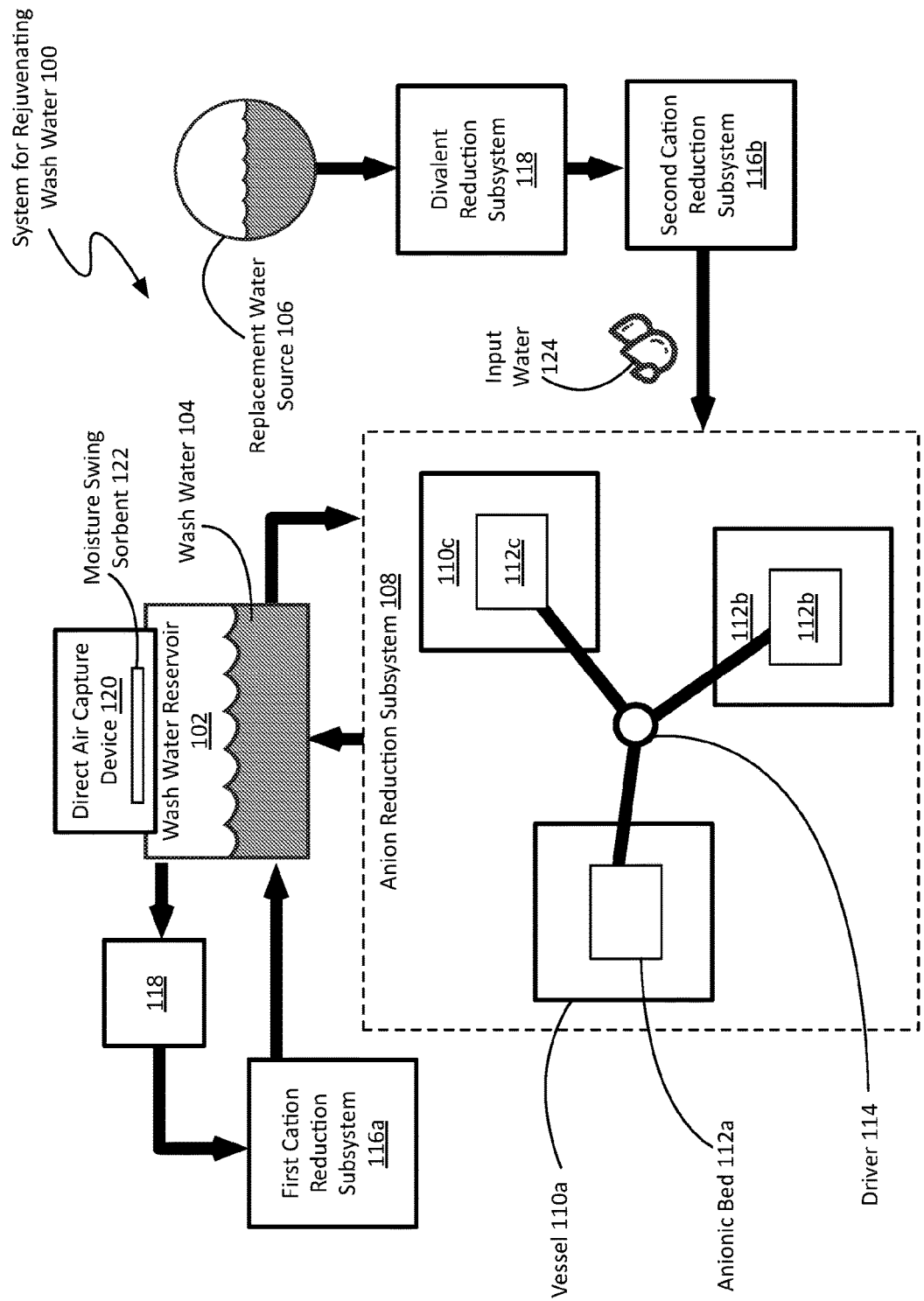
FIG. 1 is a schematic view of a system for rejuvenating wash water.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. Nevertheless, the capture technologies are still new and still possess weaknesses particular to each method of carbon dioxide capture. Direct air capture (DAC) systems relying on moisture swing sorbents have been shown to be cost effective and energy efficient. The anionic exchange resins performing the moisture swing bind carbon dioxide when dry and release it again when wet. Air capture is performed by exposing filters containing these resins to ambient air. The air dries the resin while delivering carbon dioxide for absorption. In the regeneration cycle the resin is exposed to moisture. One way of applying moisture is to submerge the ion exchange resin in water, another is to expose it to water vapor. High humidity levels and elevated temperatures combine to drive the carbon dioxide off the resin.

However, even moisture swing DAC systems have weaknesses. For the resin to be active, the anions present should be dominated by hydroxide, carbonate, and bicarbonate ion. Chlorides, sulfates or other ions are inactive, and their presence would unnecessarily limit the uptake capacity of the resin. It is therefore important that resins are not converted accidentally to hold other anions, and thus deactivate. The advantage of delivering water as vapor or condensate is that the water touching the resin is free of other anions, and thereby introduces little opportunity for deactivating the resin. The advantage of liquid water is that it can accelerate the regeneration process. A major challenge for the liquid water approach is to minimize the substitution of hydroxide and dissolved inorganic carbon anions with other anions, for example chlorides or sulfates.

Whether using liquid water or water vapor, the system will lose water to evaporation. As the water evaporates, the concentration of the various substances left behind increases over time, eventually interfering with the operation of the resins. The gradual increase in salinity, chloride and sulfate ions, and other dissolved solids needs to be managed for efficient long-term operation of the DAC.

Furthermore, one of the advantages of DAC systems using moisture swing resins is that they can be operated using readily available water sources, such as ground water, river water, lake water, and the like. While these sources are sufficient to operate the moisture swing, they are not pure. Trying to solve the problem by simply flushing the system with water will have limited effectiveness, and make the system less efficient over all.

Contemplated herein are systems and methods for rejuvenating wash water used in conjunction with moisture swing sorbent materials. These systems and methods provide affordable water treatment or rejuvenation processes capable of being fully integrated into the operation of a direct air capture system utilizing the moisture swing. This water rejuvenation system makes it possible to wash the sorbent filters with water supplied from a source like tap water or other readily available water that retains a significant amount of salinity.

According to various embodiments, the system contemplated herein maintains a high bicarbonate to total anion ratio within the DAC (i.e. removal of impurity anions), and in some embodiments removes cations from the mix as well. This allows the DAC to operate continuously without worry about piling up contaminants. The system may be implemented in a non-intrusive manner, and permit clean up from the water born deposits without operator intervention or interruption of normal operation. This is advantageous over conventional DAC systems, that require operator intervention and are constrained to operate in a particular environment (e.g. access to pure water, particular climate conditions, etc.).

It should be noted that while the following discussion will mostly be done in the context of regenerating moisture swing sorbents for direct air capture, those skilled in the art will recognize that the systems and methods contemplated herein may be adapted for different kinds of moisture swing sorbents, as well as other applications.

FIG. 1 is a schematic view of a non-limiting example of a system for rejuvenating wash water. As shown, the system 100 comprises an anion reduction subsystem 108 in fluid communication with a wash water reservoir 102 comprising wash water 104. In some embodiments, a first cation reduction subsystem 116a may also be in fluid communication with the wash water reservoir 102. In other embodiments, a divalent reduction subsystem 118 may also be in fluid communication with the wash water reservoir 102, and may be upstream from the first cation reduction subsystem 116a such that it receives wash water 104 from the reservoir 102, and passes the water along to the first cation reduction subsystem 116a after processing it, where it will be further rejuvenated. The first and second cation reduction subsystems 116a, 116b, will be discussed in greater detail in the context of FIGS. 5 and 6A-6B, below. The divalent reduction subsystem 118 will be discussed in greater detail with respect to FIG. 7, below.

In the context of the present description and the claims that follow, rejuvenation of wash water refers to the process of removing materials from a water that would be detrimental to the performance of a moisture swing sorbent 122 that uses that water for regeneration. The gradual evaporation of the wash water in a DAC system means that over time, the concentration of the materials left behind will increase. Rejuvenation refers to decreasing the concentration of those materials that could reduce the effectiveness of the sorbent 122.

As shown, the wash water reservoir 102 is coupled to a direct air capture device 120. In some embodiments, the DAC 120 and the wash water reservoir 102 may be separate from each other, while in others the DAC 120 and reservoir 102 may be integrated. In some embodiments, the system 100 may be incorporated into a DAC 120, while in other embodiments, the system 100 contemplated herein may stand apart from the DAC 120 whose wash water 104 it is rejuvenating. In some embodiments, a single system 100 may rejuvenate wash water 104 for multiple DACs 120.

It should be noted that while the systems and methods contemplated herein are discussed in the context of a DAC 120 that submerges sorbent resin into liquid water for regeneration, those skilled in the art will recognize that these processes could be adapted for use with water vapor DAC system as well. Furthermore, those skilled in the art will recognize that the water rejuvenation system and methods contemplated herein may be applied to technologies beyond DAC devices, including any technology or device where a sorbent filter is inundated with water, or other liquids holding impurities, for regeneration.

The system 100 contemplated herein considers the water within the DAC 120 and various subsystems to be one of four types. The first type is input water 124 received from a replacement water source 106. Input water 124 is water of low salinity, but whose dissolved salts are mainly chlorides and sulfates. According to various embodiments, this may be tap water, or may come from a different source, including but not limited to untreated river water, lake water, ground water, and water that has been treated to resemble such levels. This water may also be referred to as make-up water, since this is the water used to replenish the water lost while operating the DAC 120.

The second type is the water circulating through the rejuvenation system 100. Since the second type contains more ions than the make-up water, it may also be referred to as a brine. The third type of water is a clean brine, which is the brine produced after it has been stripped of impurity ions. Lastly, the fourth type is a low salinity brine, which is obtained by removing cations for the purpose of maintaining a low level of salinity inside the regeneration system 100.

The water rejuvenation system contemplated herein employs ion exchange resins in one or more beds to perform three functions: clean up the incoming or first water, upgrade the recirculating or second water in the regeneration chamber, and to remove excess salinity (i.e. create fourth water) from this water as evaporation gradually concentrates all salts.

According to various embodiments, the system 100 comprises an anion reduction subsystem 108. The anion reduction subsystem 108 is responsible for reducing the concentration of unwanted anions within the system 100. As shown, in some embodiments the anion reduction subsystem 108 is in fluid communication with the wash water reservoir 102 and the replacement water source 106. The anion reduction subsystem 108 employs one or more vessels 110, each having an anionic bed 112 that is able to absorb particular anions. The subsystem 108 performs a number of operations using the vessels, operating cyclically in a manner that will be discussed in greater detail with respect to FIG. 5.

In some embodiments, the anion reduction subsystem 108 may comprise a single vessel 110a which will perform all operations. In other embodiments, the anion reduction subsystem 108 may comprise two vessels 110ab, which may be configured to divide the operations for efficient operation. In still other embodiments, including the non-limiting example shown in FIG. 1, the anion reduction subsystem 108 may comprise three vessels 110abc, one for each of the three operations that make up an anion reduction cycle.

In some embodiments, each vessel 110 in the anion reduction subsystem 108 may be configured to perform conditioning, cleaning, and upgrading operations, and in some cases perform them all. This may be accomplished by placing each vessel 110 in fluid communication with the various sources and drains required by each operation, keeping the anionic bed 112 within the vessel 110 throughout the cycle. In other embodiments, a vessel 110 may specialize in a single operation. In some cases, each vessel 110 may only be responsible for performing a single operation. As shown, in some embodiments, the anion reduction subsystem 108 comprises a driver 114 that is coupled to each anionic bed 112 in the subsystem 108. Upon completion of the operations, the beds 112 are moved by the driver to the next vessel 110 and the cycle continues. Those skilled in the art will recognize that the driver 114 may be any actuator, motor, engine, piston, belt, or the like, capable of moving an anion bed 112 from one vessel 110a to another vessel 110b. The vessels 110, and the operations performed within them, will be discussed in greater detail with respect to FIGS. 2A-4, below.

In one embodiment, the anion reduction subsystem 108 may comprise one vessel 110. In another embodiment, the anion reduction subsystem 108 may comprise two vessels 110. In still another embodiment, the anion reduction subsystem 108 may comprise three vessels 110. In yet another embodiment, the anion reduction subsystem 108 may comprise four or more vessels 110, with at least two vessels performing the same operation at the same time.

It should be noted that FIG. 1, like all of the other figures, is a schematic view. The various components and subsystems contemplated herein may be implemented in a variety of structures. Those skilled in the art will recognize that the system and method contemplated herein may be actualized in a number of different ways. For example, in one embodiment, each subsystem may be housed in a separate unit, while in another embodiment, the entire rejuvenation system 100 may be enclosed in a single enclosure. In some embodiments, the vessels 110 may change roles, while in other embodiments the roles are static and the beds 112 change vessels 110. Still other embodiments may blend these two approaches. The system 100 and method contemplated herein may be implemented in numerous ways without departing from the spirit of the disclosure.

Figure 2A:
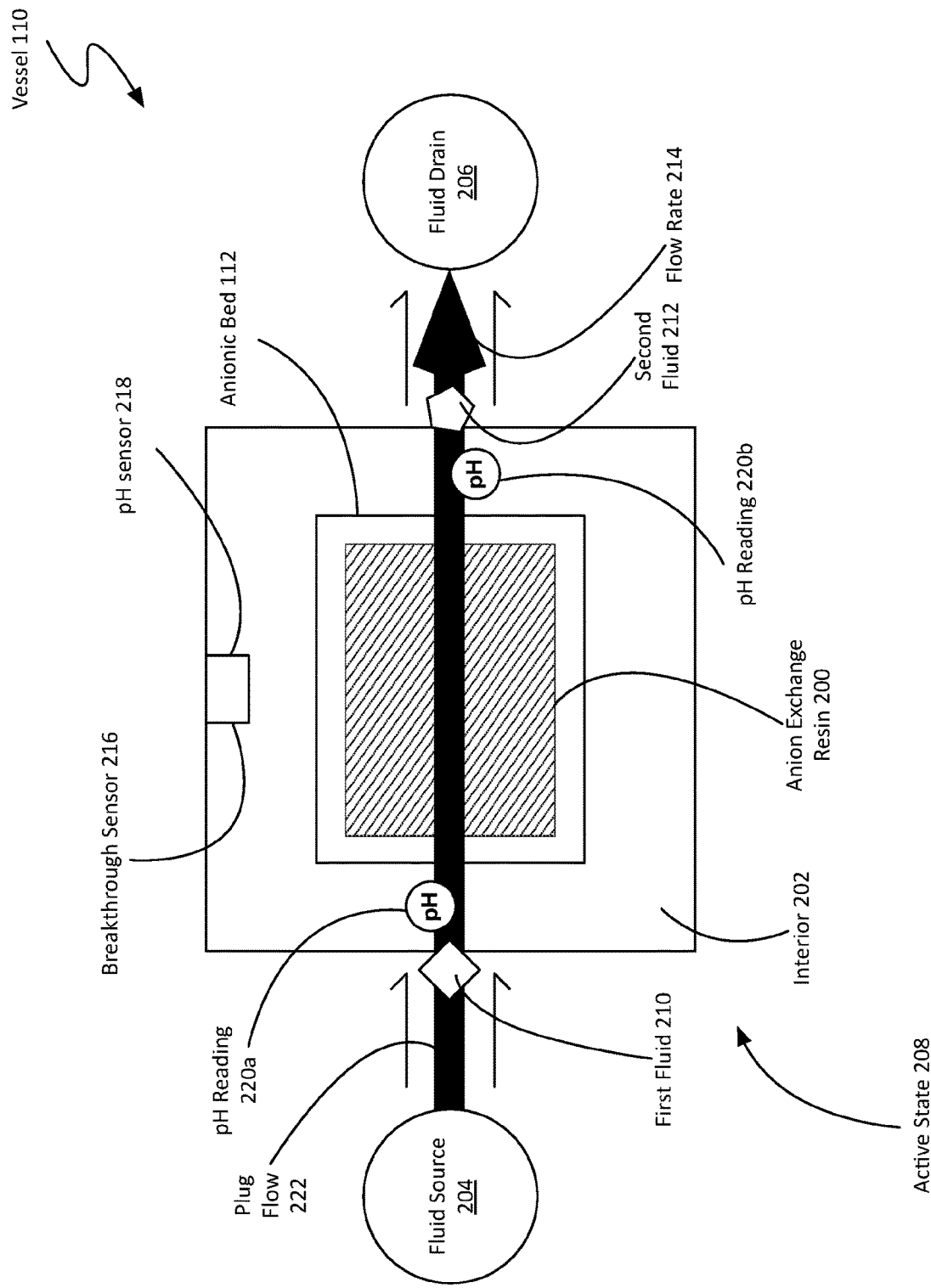
FIGS. 2A and 2B are schematic views of a vessel in an active and inactive state, respectively.
Figure 2B:
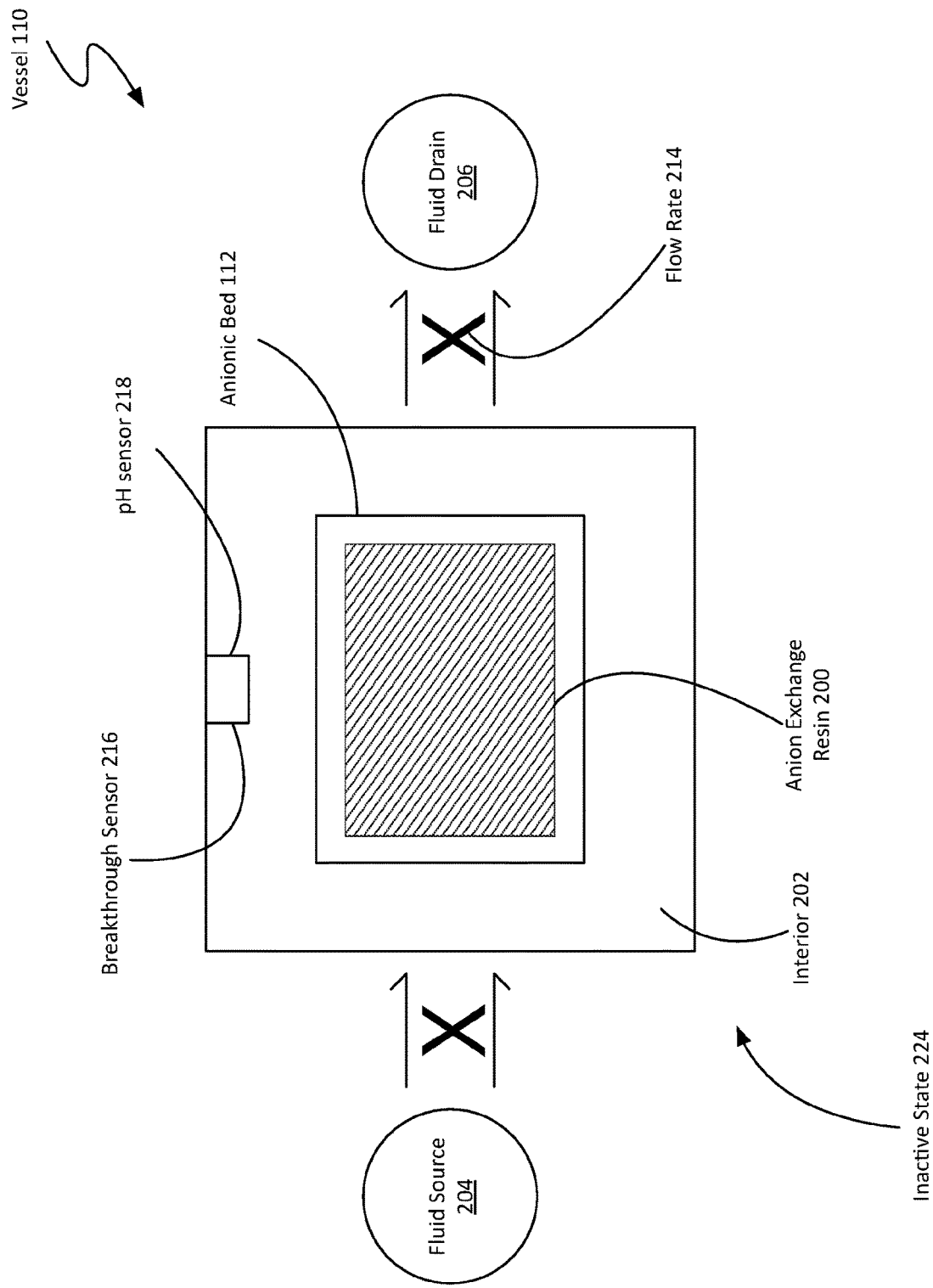

FIGS. 2A and 2B are schematic views of a non-limiting example of a vessel 110. Specifically, FIG. 2A is a schematic view of a vessel 110 in an active state 208, and FIG. 2B is a schematic view of the same vessel 110, now in an inactive state 224. In the context of the present description and the claims that follow, a vessel 110 is a container or cavity that at least partially encloses an anionic bed 112, and is sufficiently enclose that it can perform an intended operation within the anion reduction subsystem 108. In some embodiments, the vessel 110 may be releasably sealed (e.g. can be closed fluid-tight and reopened to switch anionic beds 112, etc.), while in other embodiments, the vessel may be partially open (e.g. open top, etc.) facilitating the transfer of anionic beds 112. According to various embodiments, each vessel 110 is able to receive one or more fluids, allow them to flow through the enclosed anionic bed 112, and then emit one or more fluid streams flowing out of the vessel 110.

Each anionic bed 112 comprises an anion exchange resin 200. The anion exchange resin 200 exchanges impurity anions with bicarbonate ions in the fluid flowing through the anion reduction subsystem 108. This exchange makes it possible for the system 100 to maintain low levels of chloride and sulfate within the wash water 104 of the DAC 120.

In some embodiments, the anion exchange resin 200 is a strong base resin. According to various embodiments, the anion exchange resin 200 is conditioned (e.g. releases the captured impurity anions) in a bicarbonate solution, or a solution that contains a mixture of bicarbonate and carbonate ions. In some embodiments, this conditioning solution may also include the two end members of pure bicarbonate and pure carbonate. According to various embodiments, the cation in the conditioning solution is an alkali ion. For example, in some embodiments, the dominant cations in the conditioning solution are sodium and/or potassium ions. In some embodiments, the anion exchange resin 200 may be the same moisture swing sorbent 122 used by the DAC 120. In other embodiments, the DAC 120 and the anion reduction subsystem 108 may employ different anion exchange resins.

It should be noted that the term "bed" simply indicates a structure configured to contain the resin 200 and permit a fluid to flow through, or otherwise be exposed to, the resin 200. According to various embodiments, the anionic beds 112 may also be referred to as ion exchange columns. Neither of these terms should be interpreted as limiting the structure beyond what is necessary for the bed 112 to serve its intended function. The geometries available, and best suited for the intended purpose, will vary depending on the nature of the resin 200 being used, and its various physical and chemical properties.

Additionally, although each vessel 110 is described as containing an anionic bed 112, the singular nature of the word 'bed' should not be interpreted as a unitary structure. In some embodiments the bed 112 may be a single structure that holds all of the resin 200 portioned for a vessel 110. In other embodiments, the bed 112 may comprise multiple structures, each comprising a portion of the resin 200 and configured to maximize the exposure of the resin 200 to a fluid flowing through the vessel 110.

According to various embodiments, each vessel 110 comprises an interior 202 within which the vessel 110 holds an anionic bed 112 with a resin 200. Furthermore, in some embodiments, the interior 202 of the vessel 110 is in fluid communication with at least one fluid source 204 (e.g. a structure or system able to emit a fluid stream) and at least one fluid drain 206 (e.g. a structure or system able to receive a fluid stream). As previously discussed, in some embodiments a vessel 110 may be configured to perform multiple operations; in some of those embodiments, a vessel 110 may be in fluid communication with more than one fluid source 204 and/or fluid drain 206. In embodiments where each vessel 110 performs a single operation, some of vessels 110 may only have one of each. The fluid sources 204 and/or fluid drain 206 may comprise a valve or other device able to permit or block the flow of a fluid. In some embodiments, a fluid source 204 and/or fluid drain 206 may comprise a conduit to another subsystem, vessel, or other object.

A vessel 110 may be in an active state 208 or an inactive state 224. In the context of the present description and the claims that follow, an active state 208 of a vessel 110 comprises a first fluid 210 flowing from a fluid source 204 to the interior 202 of the vessel 110, where it flows through and interacts with the anionic bed 112 of the vessel 110. Exposure of the first fluid 210 to the resin 200 results in an anion exchange, taking some of the first fluid 210 and creating a second fluid 212 having a different ionic composition than the first fluid 210, the second fluid 212 flowing from the interior 202 to a fluid drain 206 of the vessel 110. The first fluid 210 enters and the second fluid 212 leaves at the same rate. In an active state 208, the flow rate 214 through the interior 202 is greater than zero.

Additionally, in the context of the present description and the claims that follow, an inactive state 224 of a vessel 110 comprises the flow of the first fluid 210 and second fluid 212 being essentially zero. In other words, the flow ceases when the vessel is placed in an inactive state 224 when the flow through the vessel 110 has substantially ceased.

As shown, in some embodiments, the vessel 110 may comprise a breakthrough sensor 216 which indicates when the resin 200 of the anionic bed 112 has reach the limit of its ability to exchange ions, also referred to as a breakthrough condition. Each of the operations performed in the vessel(s) 110 of an anion reduction subsystem 102 involves the exchange of ions using the anionic beds 112. When the breakthrough condition has occurred, even if fluid continues to flow through/over/next to the resin 200, no further meaningful ionic exchange will occur. In some embodiments, breakthrough may be considered to have occurred before the exchange rate has bottomed out, and may instead represent the point when the diminishing returns of further exposure to the first fluid 210 have become too high. In other words, the breakthrough condition may represent the limit of efficient execution of the operation, rather than the limit of physical ability to execute the operation, according to some embodiments.

In some embodiments, the breakthrough sensor 216 may be a pH sensor 218, or a plurality of pH sensors 216. Breakthrough may be considered to have occurred when the pH reading 220a of the first fluid 210 is substantially (i.e. within 10%) equal to the pH reading 220b of the second fluid 212, indicating that the resin 200 is no longer exchanging ions to any meaningful degree. In other embodiments, the breakthrough sensor 216 may perform a similar comparison using some other observable quantity that indicates a change in water chemistry associated with breakthrough.

Referring back to the non-limiting example of a rejuvenation system 100 shown in FIG. 1, in some embodiments, the anion reduction subsystem 102 may comprise three vessels 110, each having an anionic bed 112 with the resin 200. According to various embodiments, the three vessels 110 are designed for, and operate with, a plug flow 222, with the brine flowing continuously through the vessels 110 from the sources 204 to the drains 206.

Figure 3A:
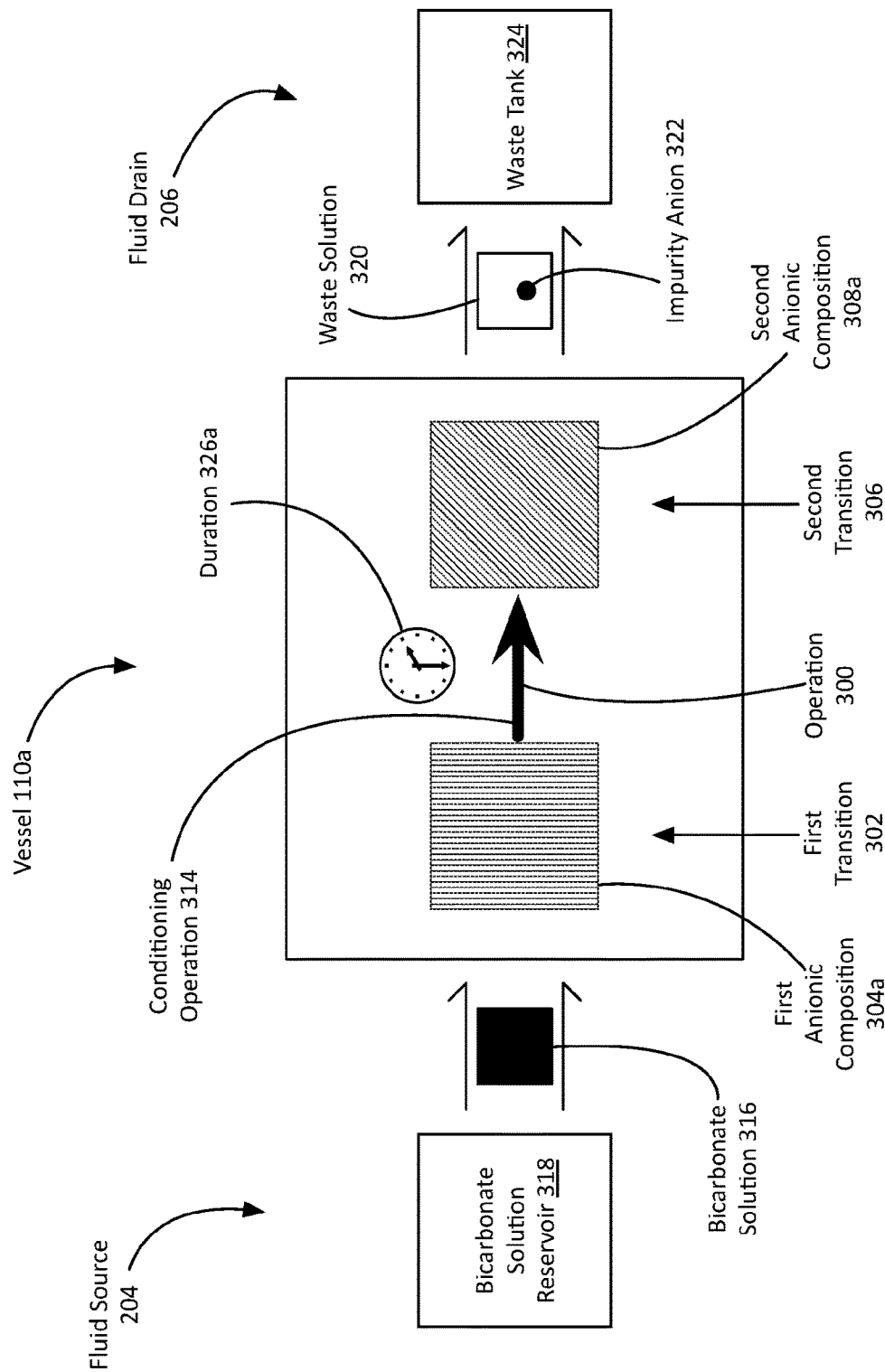
FIGS. 3A, 3B, and 3C are schematic views of vessels performing a conditioning, upgrading, and cleaning operation as part of an anion reduction subsystem.
Figure 3B:
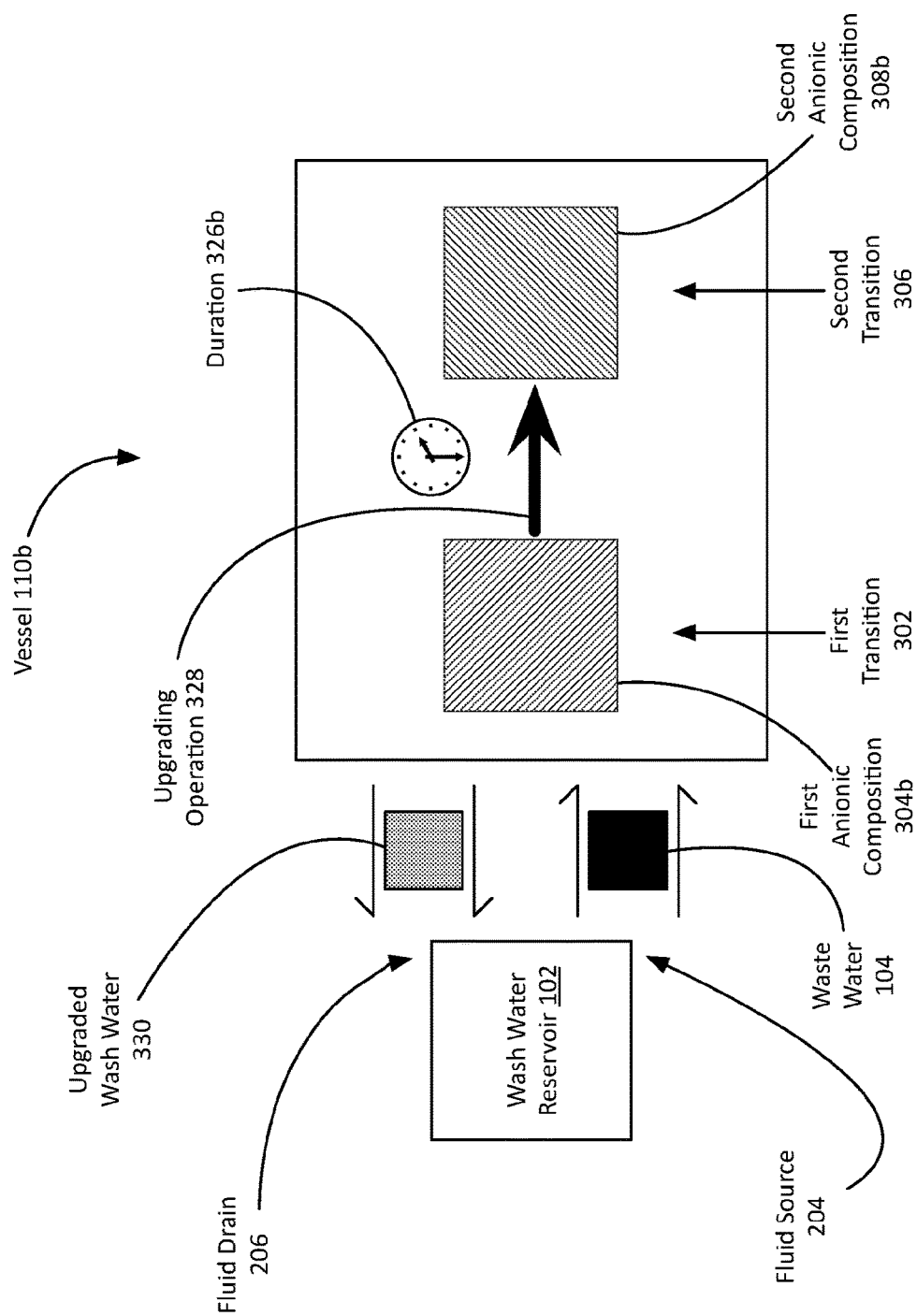
Figure 3C:
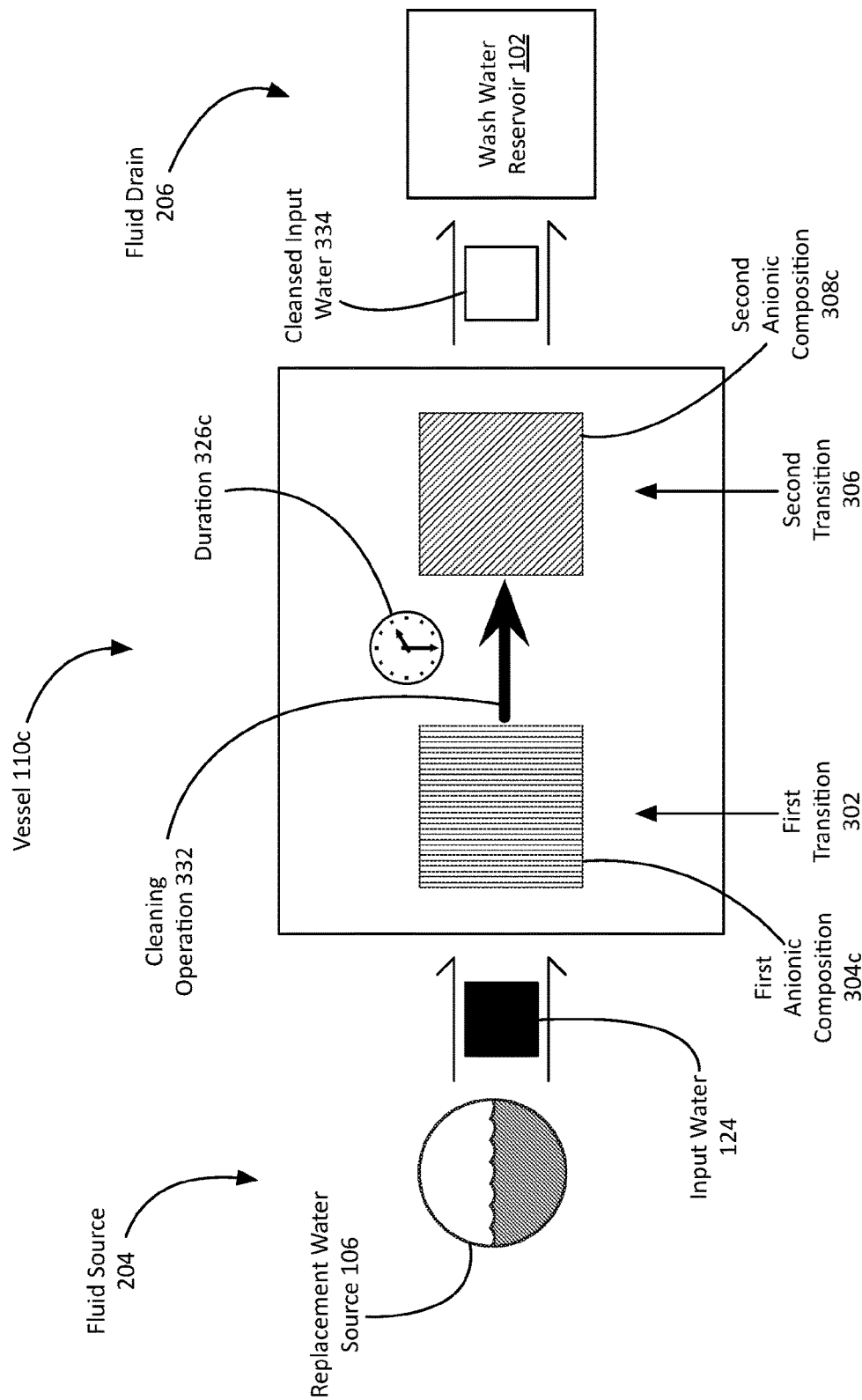

FIGS. 3A, 3B, and 3C are schematic views of non-limiting examples of vessels 110 performing various operations 300. Specifically, FIG. 3A shows a conditioning operation 314, FIG. 3B shows an upgrading operation 328, and FIG. 3C shows a cleaning operation 332, as part of an anion reduction subsystem 102.

Each vessel 110 of the anion reduction subsystem 102 is configured to perform at least one operation 300. In the context of the present description and the claims that follow, an operation 300 in the anion reduction subsystem 102 comprises a first transition 302 and a second transition 306. The first transition 302, meaning the transition of the vessel 110 from an inactive state 224 to an active state 208, occurs when the anionic bed 112 positioned within the interior 202 of the vessel 110 has a first anionic composition 304 trapped inside the resin 200 of the bed 112 when the first fluid 210 begins to flow. The second transition 306, meaning the transition of the vessel 110 from the active state 208 to the inactive state 224, occurs when a breakthrough condition 310 has been reached for the anionic bed 112, leaving the resin 200 having a second anionic composition 308 trapped inside the resin 200 as the fluid stops flowing. The second anionic composition 308 has a ratio of anions 312 that is substantially equal (within 5%) to the ratio of anions in the first fluid 210 (i.e. the resin 200 is no longer exchanging ions because it matches the first fluid 210).

FIG. 3A also shows a non-limiting example of a condition operation 314, which applies a bicarbonate solution to the resin 200 to flush out impurity anions 322. According to various embodiments, the conditioner operation 314 makes use of a bicarbonate solution 316 (i.e. the first fluid 210) of the maximum possible concentration and taken from a bicarbonate solution reservoir 318 (i.e. fluid source 204) to flush out impurity anions 322 collected in the bed 112a from exposure to the brine. The bicarbonate solution 316 exchanges ions and becomes a waste solution 320 (i.e. second fluid 212), which is sent to a waste tank 324 (i.e. fluid drain 206).

According to various embodiments, the resin 200 of this vessel 110a reaches breakthrough condition after a duration 326a. The vessel 112a is monitored for bicarbonate breakthrough; once this breakthrough occurs, the flow in the vessel 112a may be stopped. In some embodiments, the bicarbonate solution 316 is generated outside the rejuvenation system 100, while in others it may be purchased. In still other embodiments, the bicarbonate solution 316 may be generate within the rejuvenation system 100 as part of another subsystem. The bicarbonate solution 316 is the cost of eliminating impurity ions 322 from the system 100.

FIG. 3B shows a non-limiting example of an upgrading operation 328, which exposes the wash water 104 from the wash water reservoir 102 to the resin 200 to pull out impurity anions 322, making it more suitable for use by the DAC 120. According to various embodiments, the upgrading operation 328 receives the wash water 104 (i.e. the first fluid 210) taken from the wash water reservoir 102 (i.e. fluid source 204) to flush out impurity anions 322 built up in the wash water 104. The wash water 104 exchanges ions and becomes an upgraded wash water 330 (i.e. second fluid 212), which has a lower concentration of impurity anions and which is sent back to the wash water reservoir 102 (i.e. fluid drain 206).

This is the operation where the wash water 104 of the DAC 120 is being rejuvenated. The resin 200 will load itself to an ion mixture similar to that in the wash water 104 (i.e. first fluid 210), reaching this point after a duration 326b. The vessel 112b is monitored for breakthrough; once this breakthrough occurs, the flow in the vessel 112b may be stopped. According to various embodiments, this operation may be the overall rate-determining operation of the anion reduction subsystem 108.

FIG. 3C shows a non-limiting example of a cleaning operation 332, which cleans the input water 124 coming from the replacement water source 106. According to various embodiments, the cleaning operation 332 receives the input water 124 (i.e. the first fluid 210) from the replacement water source 106 (i.e. fluid source 204) and passes it through the anionic bed 112c to clean it of unwanted ions. The resin 200 exchanges ions with the input water 124 to generate a cleansed input water 334 (i.e. second fluid 212) that has a lower concentration of impurity anions than the input water 124, and is sent to the wash water reservoir 102 (i.e. fluid drain 206) to replace water that has been lost.

The ions in the input water 124 are exchanged into a mixture that reflects the concentration ratios in the wash water 104. According to various embodiments, the flow rate through this vessel 110c is determined by the overall demand for make-up water. In some embodiments, the flow rate through this vessel 110c will be much smaller than the recirculating flow rates in the wash water reservoir 102 and DAC 120.

Figure 4:
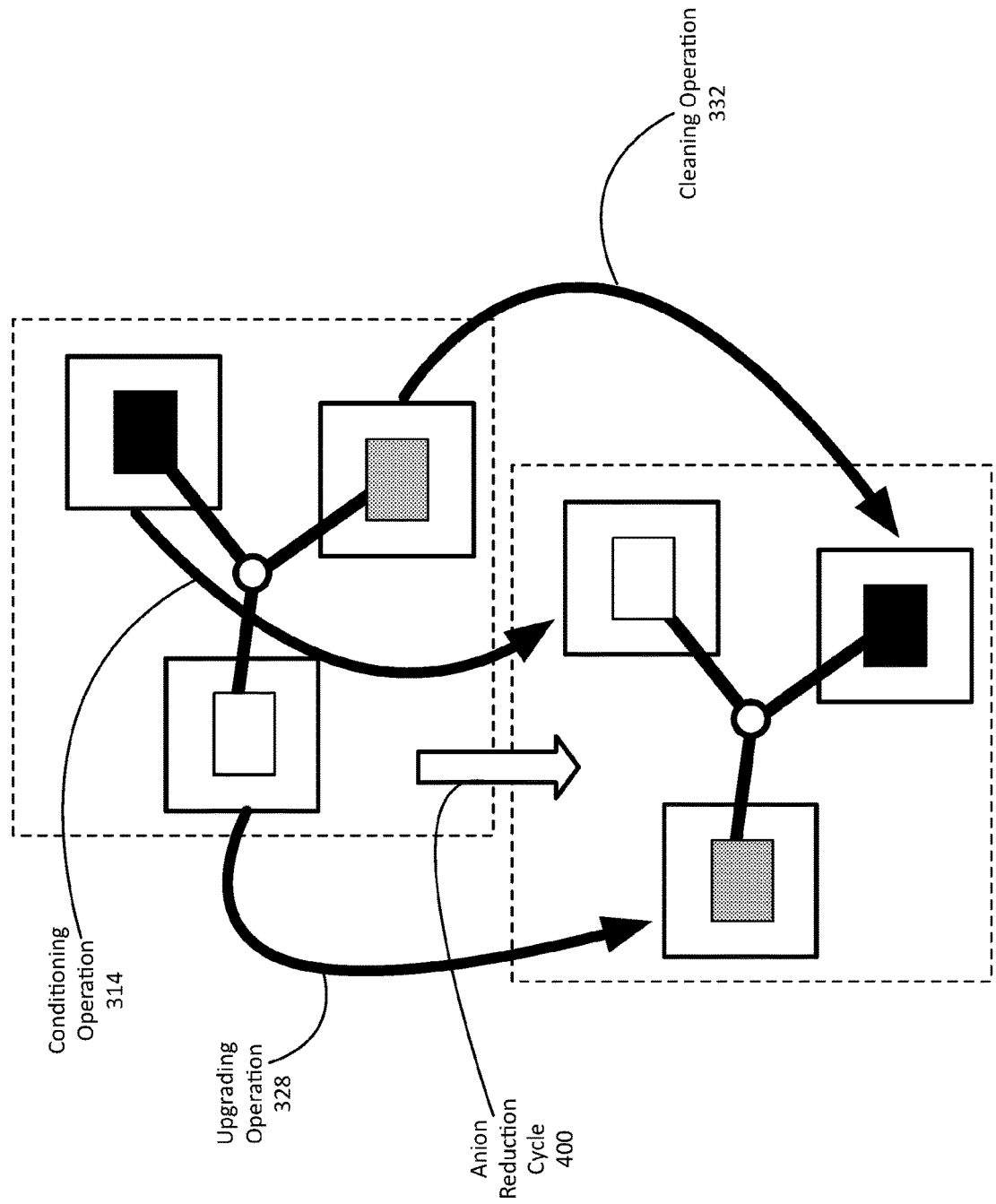
FIG. 4 is a schematic view of an anion reduction subsystem performing a cycle.

FIG. 4 is a schematic view of a non-limiting example of an anion reduction subsystem performing an anion reduction cycle 400. In the context of the present description and the claims that follow, a single anion reduction cycle 400 (or cycle 400) comprises the performance of a conditioning operation 314, an upgrading operation 328, and a cleaning operation 332. The performance of one operation 300 prepares an anionic bed 112 for the performance of the next operation 300, according to various embodiments.

As a specific example, in an embodiment having three vessels 110, the second anionic composition 308a of the conditioning operation 314 is the first anionic composition 304b of the upgrading operation 328, the second anionic composition 308b of the upgrading operation 328 is the first anionic composition 304c of the cleaning operation 332, and the second anionic composition 308c of the cleaning operation 332 is the first anionic composition 304a of the conditioning operation 314.

In some embodiments, the cycle 400 comprises the performance of the three operations, combined with a preparation required to make the anion reduction subsystem 108 ready for another cycle 400. For example, in embodiments having more than one vessel 110 that also comprises a driver 114, after all three operations have been performed, the subsystem 108 may be made ready for another cycle by moving the beds 112 into the next vessel 110, satisfying the starting conditions defined for the first transition 302 for the operations 300. In embodiments that do not move the beds 112, said preparation may comprise opening and closing valves to switch the fluid source 204 and fluid drain 206 for each vessel 110.

In an embodiment with at least three vessels 110, the performance of the operations 300 may be substantially simultaneous. For example, in one embodiment, for at least a majority of the cycle 400, the upgrading operation 328 is performed in a first vessel 110a while the cleaning operation 332 is performed in a second vessel 110b and the conditioning operation 314 is performed in a third vessel 110c. Upon completion of the cycle 400 (in this embodiment, the cycle 400 not including the preparation for the next cycle 300), the driver 114 moves the three anionic beds 112, shifting the anionic bed 112a of the first vessel 110a to the interior 202 of the second vessel 110b, the anionic bed 112b of the second vessel 110b to the interior 202 of the third vessel 110c, and the anionic bed 112c of the third vessel 110c to the interior 202 of the first vessel 110a. In other embodiments, the cycle 400 may include this movement of beds 112, which is part of the preparation for the start of the next cycle 400.

In some embodiments having a single vessel 110, the conditioning, upgrading, and cleaning operations are performed sequentially during each cycle 400. In other embodiments having two vessels 110, the upgrading operation 328 may be performed in one vessel 110a while the conditioning operation 314 and the cleaning operation 332 may be performed sequentially in the other vessel 110b while the upgrading operation is being performed. The flow rate in the second vessel 110b may be chosen such that the cleaning and conditioning operations are done at roughly the same time as the upgrade operation 328 of the first vessel 110a. Upon completion of all the operations, the driver 114 may swap the two anionic beds 112, according to some embodiments. In other embodiments, the fluid source and drains may be reconfigured to swap the roles filled by the two vessels 110, as previously discussed.

According to various embodiments having more than one vessel 110, when the upgrade operation 328 is complete, the vessels 110 change roles and/or their anionic beds 112 change positions. In such embodiments, the flow rates in the other vessels 110 may be chosen such that they can reach breakthrough conditions earlier than the vessel 110 performing the upgrading operation 328. The system 100 continues to reduce the anion concentration using the anion reduction subsystem 108 cyclically. The net result is a constant removal of impurity anions from the system 100.

Some embodiments make use of three vessels 110, while other may use less than three, and still others may use more than three. In embodiments where less than three vessels 110 are used, not all three operations 300 occur concurrently. Instead, one or two stages of the process will operate at any given time. In some embodiments, the water rejuvenation system 100 may have multiple sets of anion reduction subsystems 108, each having three vessels 110, divided among the three roles. In yet other embodiments, a plurality of such vessels 110 may be deployed in the different stages in different numbers, accommodating different times in the different stages of the operations 300.

The rejuvenation system 100 typically operates on a timescale greater than the DAC 120 coupled to the wash water reservoir 102. In some embodiments, one anion reduction cycle 400 may take place over the equivalent of 10 to 100 regeneration cycles of the DAC 120. In other embodiments, the two systems may operate on similar time scales.

According to various embodiments, the anionic beds 112 will cycle through all three vessels 110 sequentially, meaning the duration 326 of each operation 300 should be approximately the same for efficient operation. In some embodiments, it is the demand for replacement water from the replacement water source 106 that sets the overall flow rate 214, and therefore a prudent design will adjust flow rates 214 in the other two vessels 110 to result in shorter durations 326 for the conditioning 314 and upgrading 328 operations. After breakthrough has been achieved in those operations, it is possible to stop flow through the beds and move on to the next cycle 400.

In some embodiments, the flow rate 214 of the active state 208 of each of the three vessels 110 results in the conditioning 314, upgrading 328, and cleaning 332 operations each having a duration 326 that is substantially equal. In other embodiments, a single anion reduction cycle 400 has a duration no greater than the duration 326 of the upgrading operation 328. In still other embodiments, the flow rate 214 of the vessel 110 performing the cleaning operation 332 is substantially similar (i.e. within 5%) to the demand for replacement water in the wash water reservoir 102.

Figure 5:
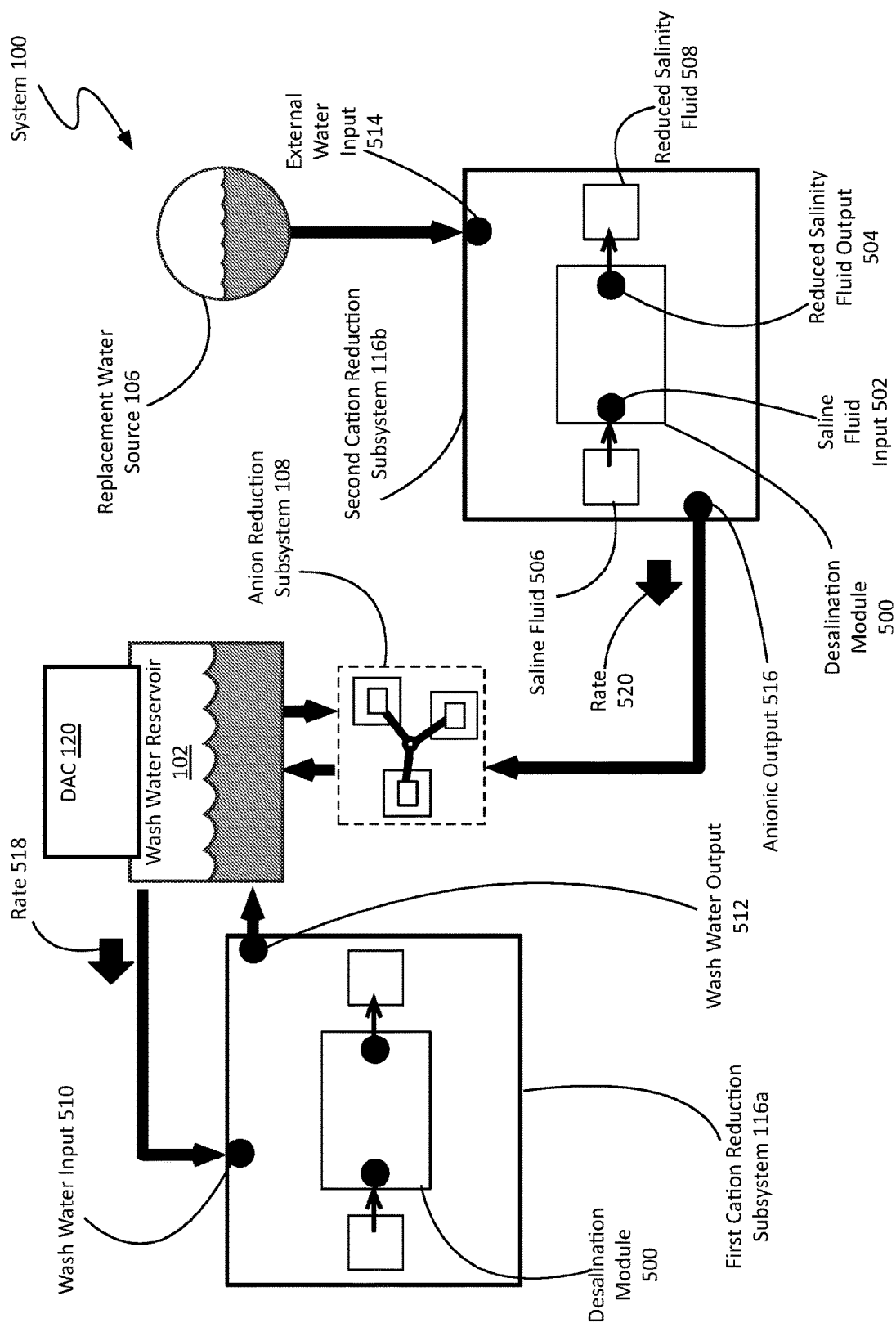
FIG. 5 is a schematic view of a system for rejuvenating wash water having first and second cation reduction subsystems.

FIG. 5 is a schematic view of a non-limiting example of a cation reduction subsystem, shown in the context of a system 100 for rejuvenating wash water 104. Specifically, FIG. 5 shows a first cation reduction subsystem 116a in fluid communication with the wash water reservoir 102, and a second cation reduction subsystem 116b in fluid communication with the anion reduction subsystem 108. While the anion reduction subsystem 108 prevents the accumulation of chloride and other unwanted anions, it does not prevent the salinity of the wash water 104 from gradually increasing with the evaporation of wash water 104 and the addition of input water 124. According to various embodiments, each cation reduction subsystem 116 removes excess cations from the wash water, reducing the salinity.

According to various embodiments, the system 100 may comprise a single cation reduction subsystem 116. In some embodiments, the cation reduction subsystem 116 may be directly coupled to the wash water reservoir 104 so it can reduce the salinity of the wash water 104 being used by the DAC 120. In other embodiments, the cation reduction subsystem 116 may be placed upstream from the anion reduction subsystem 108, meaning between the anion reduction subsystem 108 and the replacement water source 106, so it can remove cations from the input water 124 that could be detrimental to the anion reduction subsystem 108.

According to various embodiments, including the non-limiting example shown in FIG. 5, the system 100 may comprise two cation reduction subsystems 116. As shown, in some embodiments, a first cation reduction subsystem 116a may be in fluid communication with the wash water reservoir 102, the first cation reduction subsystem 116a having a wash water input 510 and a wash water output 512, both in fluid communication with the wash water reservoir 102. Fluid moves through the first cation reduction subsystem 116a at a first desalination flow rate 518. The system 100 may also comprise a second cation reduction subsystem 116b, in fluid communication with the replacement water source 106 through an external water input 514 and with the anion reduction subsystem 108 through an anionic output 516. Fluid moves through the second cation reduction subsystem 116b at a second desalination flow rate 520. According to various embodiments, a cation reduction subsystem 116 may comprise additional inputs and/or outputs, which will be discussed in greater detail with respect to FIGS. 6A-6C, below.

As shown, each cation reduction subsystem 116 comprises a desalination module 500. According to various embodiments, a desalination module 500 is a device that is able to remove cations from a fluid. More specifically, each desalination module 500 comprises a saline fluid input 502 through which it receives a saline fluid 506, and a reduced salinity fluid output 504, from which it emits a reduced salinity fluid 508. The reduced salinity fluid 508 has a lower salinity than the saline fluid 506.

Some cation reduction subsystems 116 may comprise a single desalination module 500 coupled to the inputs and outputs of the cation reduction subsystem 116, while others may comprise multiple desalination modules 500, which may be interconnected. For example, in a cation reduction subsystem 116 having two desalination modules 500, the first desalination module 500a may have its saline fluid input 502 coupled to the input of the cation reduction subsystem 116, and its reduced salinity fluid output 504 coupled to the saline fluid input 502 of the second desalination module 500b, whose reduced salinity fluid output 504 is coupled to the output of the cation reduction subsystem 116.

The cation reduction subsystems 116 may make use of different desalination modules employing various methods for desalination. According to various embodiments, the system 100 comprises desalination modules 500 employing three of the most direct approaches to removing the excess cations, which are reverse osmosis, precipitation of bicarbonate, and cationic exchange with protons. These three modules will be discussed in greater detail with respect to FIGS. 6A-6C, below. Specifically, a purification module 600 making use of reverse osmosis will be discussed with respect to FIG. 6A, a precipitation module 608 making use of the precipitation of bicarbonate will be discussed with respect to FIG. 6B, and a scavenge module 614 making use of cationic exchange with protons will be discussed with respect to FIG. 6C.

In some embodiments, reverse osmosis may be used as a preprocessor to either the precipitation of bicarbonate or the cationic exchange. It is possible to use purification module 600 as a precursor to either precipitation module 608 or scavenge module 614. Reverse osmosis is particularly helpful for the precipitation of bicarbonate, and would make it possible to return purified water from the purification module 600 back into the wash water reservoir 102 and then use precipitation module 608 or scavenge module 614 to remove excess salt from the concentrated brine thus produced, as will be discussed below.

Some cation reduction subsystems 116 may have three different desalination modules 500. For example, in some embodiments, the first cation reduction subsystem 116a comprises a purification module 600 whose saline fluid input 502 is coupled to the wash water input 510 of the first cation reduction subsystem 116a, either a precipitation module 608 or a scavenge module 614 whose reduced salinity fluid output 504 is coupled to the wash water output 512, and the remaining desalination module coupled between, so its saline fluid input 502 receives the concentrated brine output by the purification module 600. Those skilled in the art will recognize these arrangements may also be applied to the second cation reduction subsystem 116b, in other embodiments.

Some cation reduction subsystems 116 may have two different desalination modules 500. For example, in some embodiments, the first cation reduction subsystem 116a comprises a purification module 600 whose saline fluid input 502 is coupled to the wash water input 510 of the first cation reduction subsystem 116a, and either a precipitation module 608 or a scavenge module 614 whose reduced salinity fluid output 504 is coupled to the wash water output 512, and whose saline fluid input 502 receives the concentrated brine output by the purification module 600. Those skilled in the art will recognize these arrangements may also be applied to the second cation reduction subsystem 116b, in other embodiments.

Some cation reduction subsystems 116 may have one desalination modules 500. For example, in some embodiments, the second cation reduction subsystem 116b may comprise one of a purification module 600, a precipitation module 608, or a scavenge module 614, whose saline fluid input is coupled to the external water input 514, and whose reduced salinity fluid output 504 is coupled to the anionic output 516. Furthermore, some embodiments of the system 100 comprise a first cation reduction subsystem 116a and a second cation reduction subsystem 16b. Other embodiments may have a single cation reduction subsystem 116. Still other embodiments may have three or more cation reduction subsystems 116. Furthermore, the ordering of the modules 500, the modules 500 used, and the nature of the modules themselves may change in other embodiments.

Figure 6A:
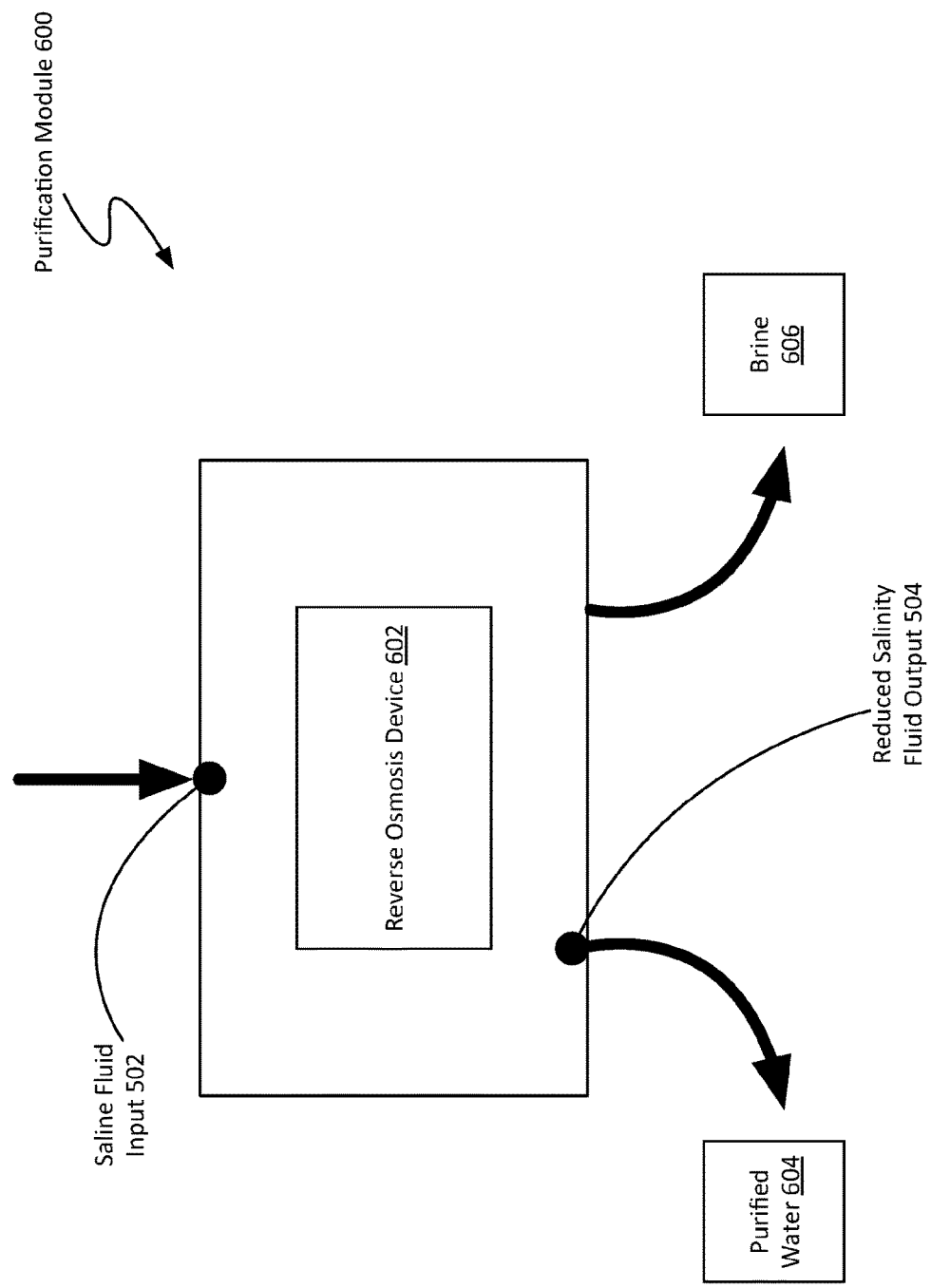
FIGS. 6A, 6B, and 6C are schematic views of purification, precipitation, and scavenge modules, respectively.
Figure 6B:
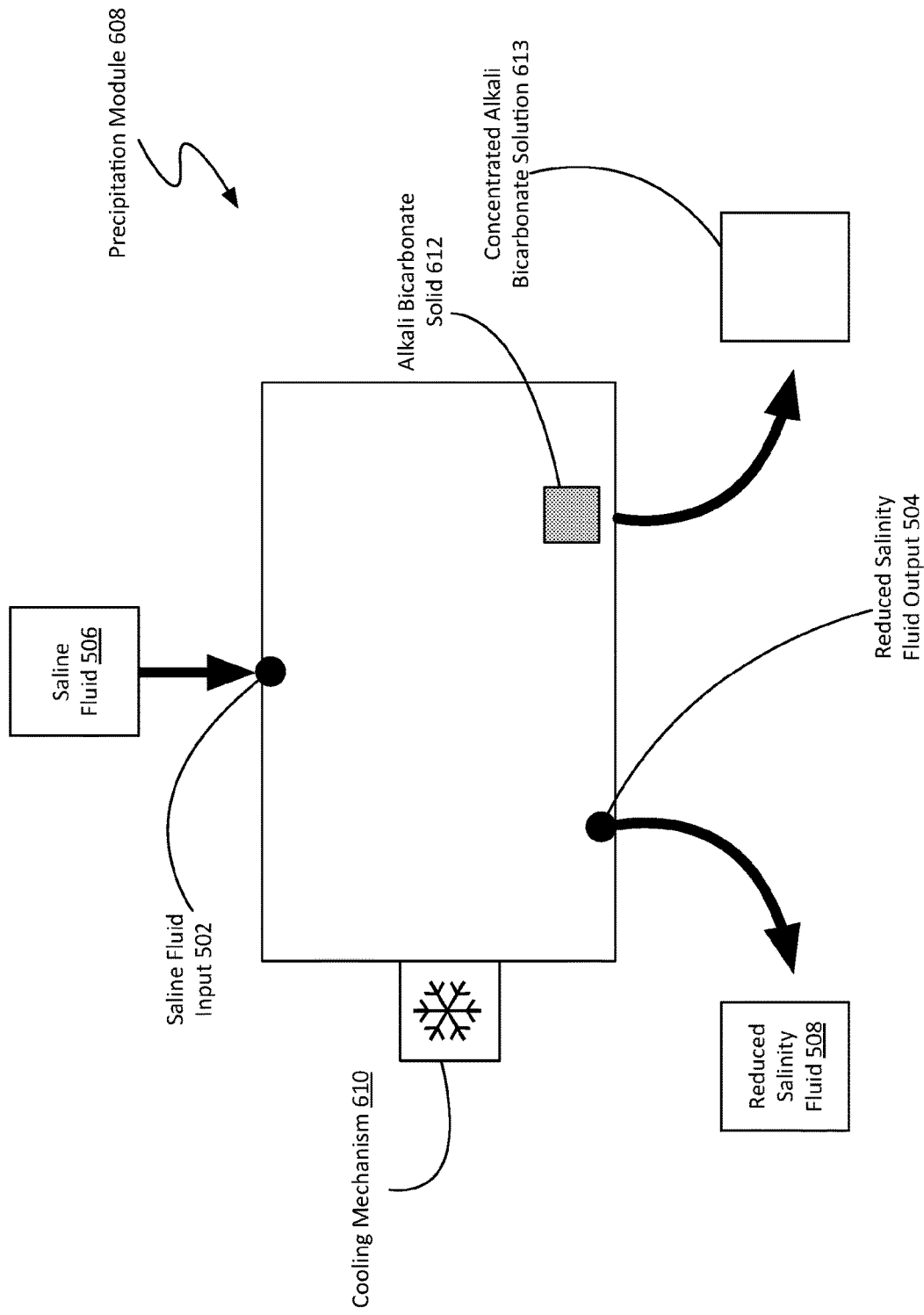
Figure 6C:
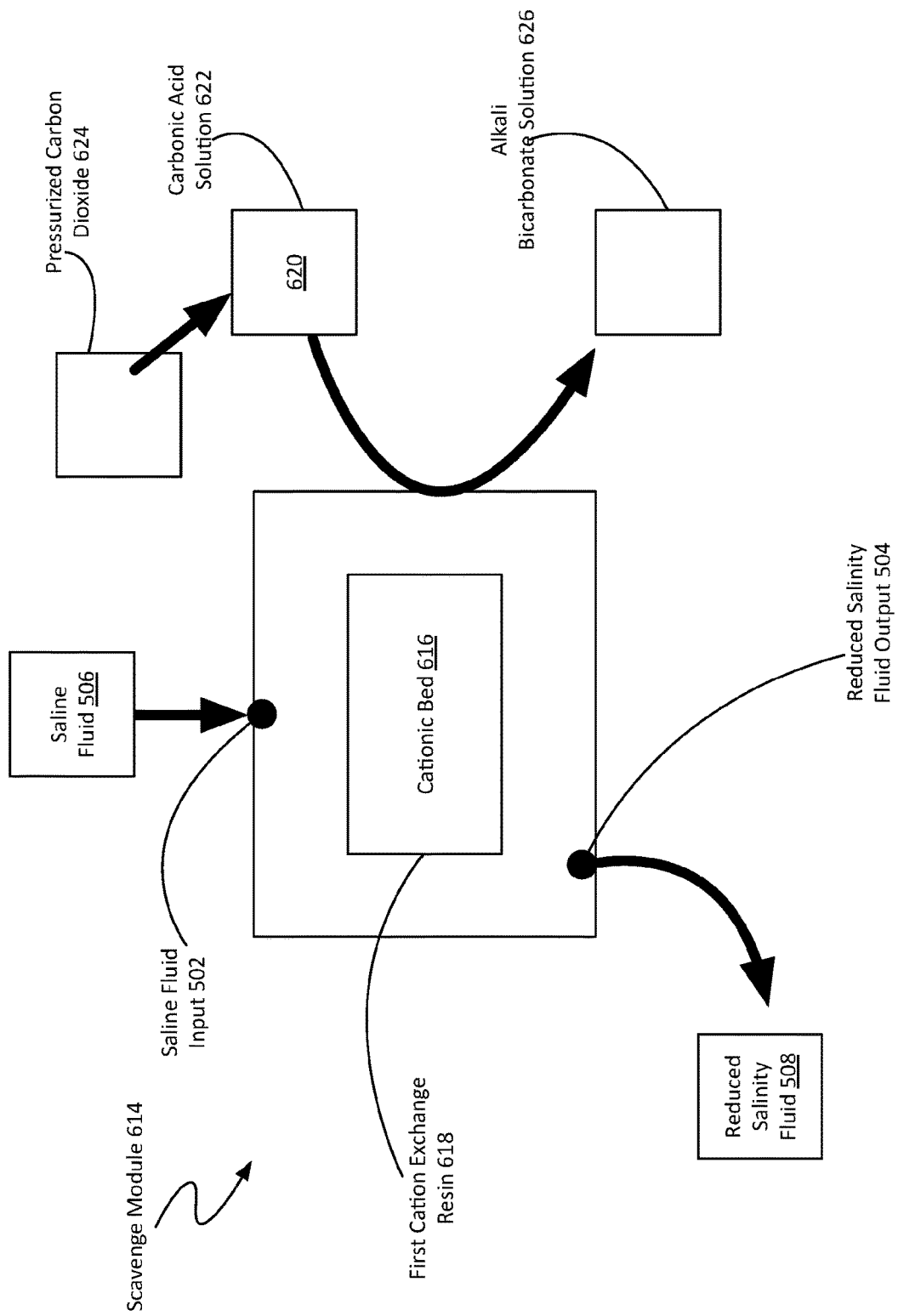

FIGS. 6A, 6B, and 6C are schematic views of non-limiting examples of a purification module 600, a precipitation module 608, and a scavenge module 614, respectively.

In some embodiments, excess cations are removed from a brine (e.g. wash water 104, etc.) using reverse osmosis. Reverse osmosis is a standard process to produce pure water from a saline brine. As shown, the purification module 600 comprises a reverse osmosis device 602 that receives a saline fluid 506 from the saline fluid input 502 of the purification module 600, and produces, using reverse osmosis, a purified water 604 that is emitted and sent directly to the wash water reservoir 102. Also produced is a concentrated brine 606 (e.g. an increased concentration of anions, etc.), which is emitted through the reduced salinity fluid output 504 of the purification module 600. In some embodiments, this byproduct may be sent to additional desalination modules 500, such as a precipitation module 608 or a scavenge module 614, while in other embodiments the concentrated brine 606 may be inserted into the anion reduction subsystem 108, or even disposed of or used outside system 100, if the increased concentration of unwanted ions would significantly impact the efficiency of the system 100 and replacement water is readily available.

In order to avoid fouling, some embodiments clean up divalent ions in the input stream prior to the reverse osmosis, as will be discussed with respect to FIG. 7, below. In some embodiments, this divalent ion cleanup occurs at the point replacement water enters the system 100 from the replacement water source 106, while in other embodiments it occurs right before the application of reverse osmosis. Some embodiments may combine the two processes. Reverse osmosis, by itself, may throw away valuable CO2. However, it may be advantageous to concentrate the brine prior to entering into a precipitation module 608 or scavenge module 614.

FIG. 6B shows a non-limiting example of a precipitation module 608, which makes use of precipitation of bicarbonate to reduce salinity of the saline fluid 506. Precipitation of bicarbonate directly removes salt from concentrated brine. The solubility of bicarbonate in a solution is a steep function of its temperature. At low temperatures, solubility is greatly reduced, and it is therefore possible to remove bicarbonate from the brine, and thereby lower its salinity. This process can largely leave behind the impurity anions, and thus may raise the impurity concentration which would however be lowered again in the anion reduction subsystem 108 discussed above.

As shown, according to various embodiments, the precipitation module 608 comprises a cooling mechanism 610 that reduces the temperature of the saline fluid 506 to the point that the bicarbonate ions precipitate as an alkali bicarbonate solid 612, which may be a sodium, potassium, or similar salt. A variety of different cooling mechanisms 610 may be employed including, but not limited to, thermoelectric or Peltier cooling, mechanical cooling (e.g. compressed refrigerant, etc.), environmental cooling, and the like. The choice of cooling mechanism 610 may depend on the scale of the system 100. A cooling mechanism 610 efficient in energy and cost for a small system 100 may be impractical or even impossible to use on a larger scale.

Advantageously, the alkali bicarbonate solid 612 obtained from the precipitation module 608 can be used to create a concentrated alkali bicarbonate solution 613 that may be used to regenerate the anion exchange resin 200 used by the anion reduction subsystem 108 and elsewhere. Assuming no losses to the outside, the system 100 is materially balanced. To the extent that losses are incurred, sodium carbonate or bicarbonate may become an external input to the system 100. In some embodiments, the additional sodium may be derived from the sodium in the input water 124.

FIG. 6C is a schematic view of a non-limiting example of a scavenge module 614, which removes excess cations from the saline fluid through cationic exchange with protons. Specifically, the scavenge module 614 desalinates the saline fluid 506 using a first cation exchange resin 618 in a cationic bed 616, in a method that may be similar to that used in the anion reduction subsystem 108. Cationic exchange resins can scavenge cations, and is preloaded with protons. Resins loaded with protons remove sodium or potassium ions from the saline fluid 506, acidify the system 100, and produce the reduced salinity fluid 508.

According to various embodiments, the scavenge module 614 regenerates the cation resin 618 using an acid solution. In some embodiments, the acid solution may be a carbonic acid solution 622. The acid solution flushes out sodium bicarbonate and/or other bicarbonate salts from the resin 618, preparing it for removal of additional cations from the saline fluid 506, and producing an alkali bicarbonate solution 626 as a byproduct.

In one embodiment, the system 100 may use pressurized $CO_2$ 624 from the DAC 120 to create a carbonic acid solution 622. By raising the pressure at which $CO_2$ is dissolved into the wash fluid 104, the pH of the fluid 104 may be lowered, helping prevent fouling of the system 100 by unwanted precipitation caused by high pH. According to various embodiments, the pressurized $CO_2$ 624 may be added to the solution as a pressurized gas stream with pressures ranging from 1 atmosphere (absolute) to 100 atmospheres.

According to various embodiments, the scale of the process has to keep up with the cation delivery rate of the input water. It is possible to implement this resin bed in a recirculating stream from the reservoir, or alternatively, to remove all cations from the input tap water. Some embodiments deploy both options. The advantage of removing cations from the input water is that it generally lowers the ion concentration in the input. However, the higher concentration of ion species in the brine in the storage vessel makes it possible to reduce the size and flow rate in the cationic exchange column. In some embodiments, both purification module 600 and precipitation module 608 may result in a stream of bicarbonate that satisfies the demands for regenerating the anion exchange resins 200. Thus, the bicarbonate may be internally generated.

In addition to impurity anions and excess cations, the entire DAC regeneration system is susceptible to fouling from hard water. Calcium and magnesium carbonates can form undesirable precipitates. These precipitates can be reduced or eliminated by removing these ions from the wash water 104.

Figure 7:
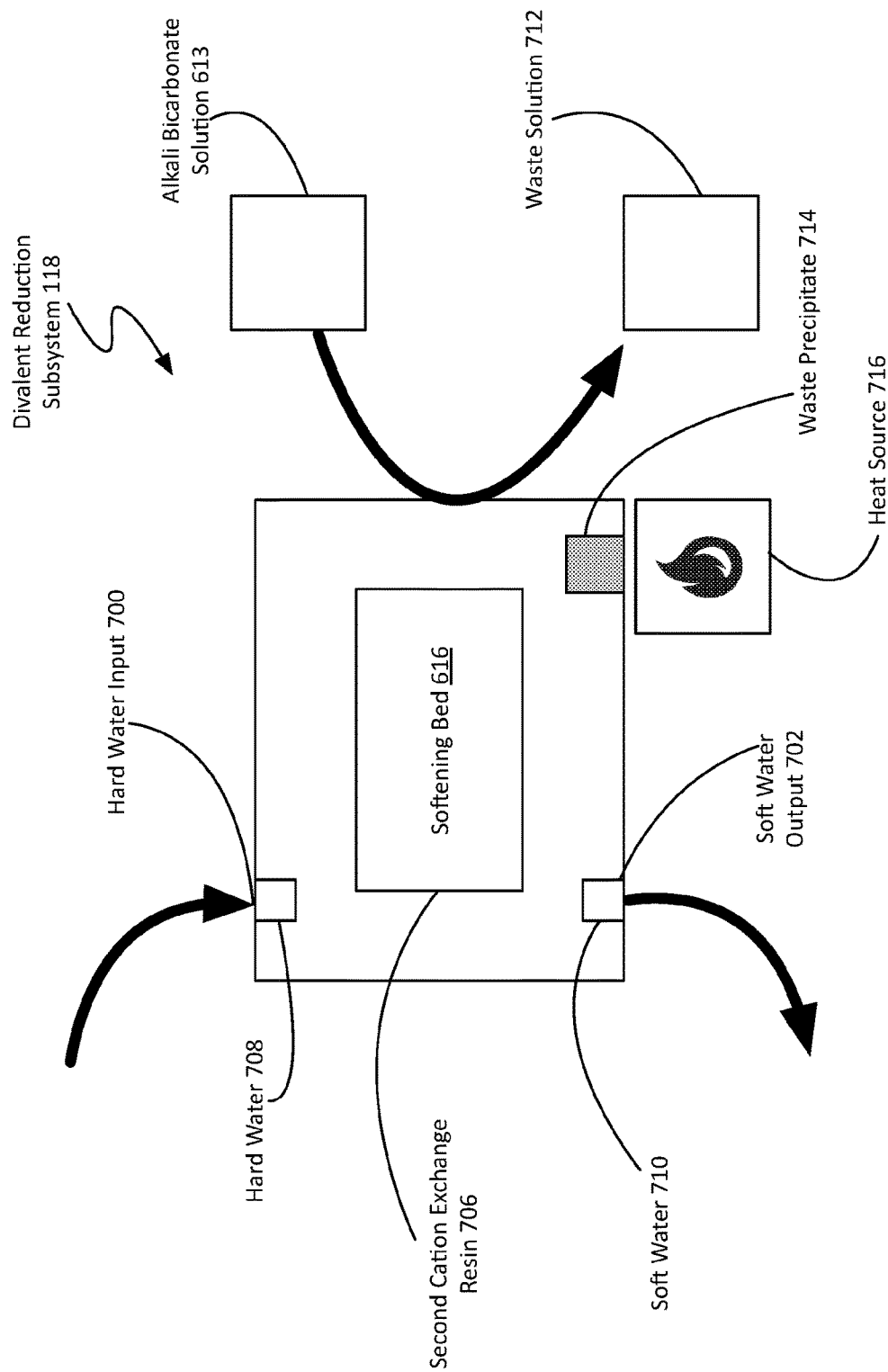
FIG. 7 is a schematic view of a divalent reduction subsystem.

FIG. 7 is a schematic view of a non-limiting example of a divalent reduction subsystem 118. As shown, the divalent reduction subsystem 118 comprises a hard water input 700 and a soft water output 702. The divalent reduction subsystem 118 also comprises a softening bed 704 that has a second cation exchange resin 706 that scavenges divalent ions from hard water 708 received through the hard water input 700 and produces soft water 710 that is provided through the soft water output 702.

When breakthrough conditions have been reached for the second cation exchange resin 706, it is regenerated using an alkali bicarbonate solution 613. In some embodiments, this alkali bicarbonate solution 613 may be generated using the alkali bicarbonate solid 612 precipitated by the precipitation module 608. In some embodiments, this solution may be provided from a source exterior to the system 100. The alkali bicarbonate solution 613 rinses the resin 706, discharging calcium and magnesium bicarbonate solutions as a waste solution 712.

The solubility of the salts found in the waste solution 712 may be reduced by lowering the $CO_2$ partial pressure and by raising the temperature of the solution 712. In some embodiments, the waste solution 712 is heated using a heat source 716, causing the precipitation of a waste precipitate 714 that comprises calcium carbonate and/or magnesium carbonate solids. Other methods for driving the precipitation of the waste precipitate 714 includes adding alkali hydroxides or carbonates to the solution 712. After precipitation, the remaining solution is largely free of bivalent ions and may be returned to the soft water output 702, according to various embodiments.

In some embodiments, a divalent reduction subsystem 118 may be placed in the system 100 upstream of every purification module 600 being used. It is beneficial to feed softened water to the reverse osmosis device 602, as hard water can cause build up over time. By adding a divalent reduction subsystem 118 at the entry point of replacement water and a second divalent reduction subsystem 118 in the brine desalination loop that circulates the wash water 104, the calcium concentration can be effectively controlled to low levels.

Where the above examples, embodiments and implementations reference examples, it should be understood by those of ordinary skill in the art that other water rejuvenation systems, devices and methods could be intermixed or substituted with those provided. In places where the description above refers to particular embodiments of systems and methods for wash water rejuvenation, it should be readily apparent that a number of modifications may be made without departing from the spirit thereof and that these embodiments and implementations may be applied to other to water purification technologies as well. Accordingly, the disclosed subject matter is intended to embrace all such alterations, modifications and variations that fall within the spirit and scope of the disclosure and the knowledge of one of ordinary skill in the art.

What is claimed is:

1. A system for rejuvenating wash water, comprising:
a wash water reservoir comprising wash water; and
an anion reduction subsystem in fluid communication with the wash water reservoir and a replacement water source, the anionic reduction subsystem comprising:
at least one anionic bed, each comprising an anion exchange resin; and
at least one vessel, each vessel of the at least one vessel having an interior in fluid communication with at least one fluid source and at least one fluid drain, each vessel of the at least one vessel further comprising:
an active state of the vessel comprising a first fluid flowing from one fluid source of the at least one fluid source to the interior of the vessel to flow through one anionic bed of the at least one anionic bed within the interior of the vessel while a second fluid flows from the interior of the vessel to one fluid drain of the at least one fluid drain, the first fluid and second fluid flowing at a flow rate greater than zero; and
an inactive state of the vessel wherein the flow of the first and second fluids has ceased;
wherein each vessel of the at least one vessel is configured to perform at least one operation, each operation of the at least one operation comprising:

a first transition of the vessel from the inactive state to the active state, the first transition occurring when the anionic bed positioned within the interior of the vessel has a first anionic composition trapped inside the anion exchange resin of the anionic bed; and a second transition of the vessel from the active state to the inactive state, the second transition occurring when a breakthrough condition has been reached for the anionic bed positioned within the interior of the vessel at the first transition after exchanging anions with the first fluid resulting in the anionic bed having a second anionic composition trapped inside the anion exchange resin of the anionic bed;

wherein the second anionic composition has a ratio of anions that is substantially equal to the ratio of anions of the first fluid;

wherein the anion reduction subsystem is configured to perform a plurality of operations comprising:

a conditioning operation performed in one vessel of the at least one vessel, wherein the first fluid is a bicarbonate solution, the fluid source is a bicarbonate solution reservoir, the second fluid is a waste solution comprising impurity anions, and the fluid drain is a waste tank;

an upgrading operation performed in one vessel of the at least one vessel, wherein the first fluid is wash water, the fluid source is the wash water reservoir, the second fluid is an upgraded wash water having a lower concentration of impurity anions than the first fluid, and the fluid drain is the wash water reservoir; and a cleaning operation performed in one vessel of the at least one vessel, wherein the first fluid is input water, the fluid source is the replacement water source, the second fluid is a cleansed input water having a lower concentration of impurity anions than the first fluid, and the fluid drain is the wash water reservoir;

wherein the second anionic composition of the conditioning operation is the first anionic composition of the upgrading operation, the second anionic composition of the upgrading operation is the first anionic composition of the cleaning operation, and the second anionic composition of the cleaning operation is the first anionic composition of the conditioning operation;

wherein the anion reduction subsystem is further configured to operate cyclically, with a cycle comprising a conditioning operation, a cleaning operation, and an upgrading operation.

2. The system of claim 1, wherein the anion reduction subsystem further comprises:

a driver coupled to the anion bed of each of the at least one vessel;

wherein the at least one vessel is three vessels and the at least one anionic bed is three anionic beds;

wherein, for at least a majority of the cycle, the upgrading operation is performed in a first vessel of the three vessels while the cleaning operation is performed in a second vessel of the three vessels and the conditioning operation is performed in a third vessel of the three vessels; and wherein, upon completion of the cycle, the driver moves the three anionic beds, shifting the anionic bed of the first vessel to the interior of the second vessel, the anionic bed of the second vessel to the interior of the third vessel, and the anionic bed of the third vessel to the interior of the first vessel.

3. The system of claim 1, wherein each vessel of the at least one vessel further comprises a breakthrough sensor configured to detect the breakthrough condition of the at least one operation of the vessel.

4. The system of claim 1, further comprising:

a first cation reduction subsystem comprising a wash water input and a wash water output, both in fluid communication with the wash water reservoir, and further comprising at least one desalination module, each desalination module comprising a saline fluid input and a reduced salinity fluid output;

wherein, for each desalination module of the at least one desalination module, the saline fluid input is in fluid communication with one of the wash water reservoir and a different desalination module, and the reduced salinity fluid output is in fluid communication with one of the saline fluid input of another desalination module and the wash water reservoir;

wherein each desalination module of the at least one desalination module receives a saline fluid through the saline fluid input of the desalination module, removes excess cations from the saline fluid, and provides a reduced salinity fluid through the reduced salinity fluid output, the reduced salinity fluid having a lower salinity than the saline solution;

wherein each desalination module of the at least one desalination module is a different one of:

a purification module that applies reverse osmosis to the saline fluid, generating a purified water that is sent to the reduced salinity fluid output as the reduced salinity fluid, and also generating a concentrated brine;

a precipitation module comprising a cooling mechanism that reduces the temperature of the saline fluid causing the precipitation of an alkali bicarbonate solid from the saline fluid and generating the reduced salinity fluid; and a scavenge module comprising a cationic bed comprising a first cation exchange resin that removes excess cations from the saline fluid through cationic exchange to produce the reduced salinity fluid, the scavenge module configured to regenerate the first cation exchange resin using an acid solution;

wherein the wash water moves through the first cation reduction subsystem at a first desalination flow rate, exiting through the wash water output having a lower salinity than the wash water entering through the wash water input.

5. The system of claim 4, further comprising:

a second cation reduction subsystem comprising an external water input in fluid communication with the replacement water source, an anionic output in fluid communication with the anion reduction subsystem, and further comprising at least one desalination module, each desalination module comprising a saline fluid input and a reduced salinity fluid output;

wherein, for each desalination module of the at least one desalination module, the saline fluid input is in fluid communication with one of the replacement water source and a different desalination module, and the reduced salinity fluid output is in fluid communication with one of the saline fluid input of another desalination module and the anion reduction subsystem;

wherein each desalination module of the at least one desalination module receives a saline fluid through the saline fluid input of the desalination module, removes excess cations from the saline fluid, and provides a reduced salinity fluid through the reduced salinity fluid output, the reduced salinity fluid having a lower salinity than the saline solution;

wherein each desalination module of the at least one desalination module is a different one of:

a purification module that applies reverse osmosis to the saline fluid, generating a purified water that is sent to the reduced salinity fluid output as the reduced salinity fluid, and also generating a concentrated brine;

a precipitation module comprising a cooling mechanism that reduces the temperature of the saline fluid causing the precipitation of an alkali bicarbonate solid from the saline fluid and generating the reduced salinity fluid; and a scavenge module comprising a cationic bed comprising a first cation exchange resin that removes excess cations from the saline fluid through cationic exchange to produce the reduced salinity fluid, the scavenge module configured to regenerate the first cation exchange resin using an acid solution;

wherein the input water moves through the second cation reduction subsystem at a second desalination flow rate, exiting through the anionic output having a lower salinity than the input water entering through the external water input.

6. The system of claim 4, wherein the at least one desalination module comprises the purification module whose saline fluid input is coupled to the wash water input, and further comprises one of the precipitation module and the scavenge module, the concentrated brine output by the purification module being sent to the saline fluid input of the one of the precipitation module and the scavenge module, whose reduced salinity fluid output is coupled to the wash water output.

7. The system of claim 4, wherein the concentrated brine produced by the purification module is sent to the anion reduction subsystem.

8. The system of claim 4, wherein the alkali bicarbonate solid produced by the precipitation module is used to produce the bicarbonate solution used to regenerate the anion exchange resin of the system.

9. The system of claim 4, wherein the acid solution used by the scavenge module to regenerate the first cation exchange resin is a carbonic acid solution produced using pressurized carbon dioxide.

10. The system of claim 9, wherein the regeneration of the first cation exchange resin using the carbonic acid solution produces an alkali bicarbonate solution as a byproduct, and wherein the alkali bicarbonate solution is used to regenerate the anion exchange resin of the system.

11. The system of claim 9, wherein the pressurized carbon dioxide is provided by a direct air capture device comprising a moisture swing sorbent regenerated by the wash water of the wash water reservoir.

12. A method for rejuvenating wash water, comprising:
performing an anion reduction cycle within an anion reduction subsystem in fluid communication with a wash water reservoir comprising wash water and a replacement water source, the anion reduction subsystem comprising at least one vessel, each vessel comprising an interior containing an anionic bed comprising an anion exchange resin, the anion reduction cycle comprising a conditioning operation, an upgrading operation, and a cleaning operation, each operation comprising:

receiving a first fluid into one vessel of the at least one vessel at a flow rate, the first fluid flowing through the anionic bed creating a second fluid that flows out of the vessel as the first fluid flows into the vessel;
determining if a breakthrough condition has been reached within the vessel; and
stopping the flow of the first fluid into the vessel in response to reaching the breakthrough condition;

wherein the conditioning operation comprises receiving a bicarbonate solution into one vessel of the at least one vessel, the bicarbonate solution flowing through the anionic bed and regenerating the anion exchange resin of the anionic bed and creating a waste solution comprising impurity anions, the waste solution flowing out of the vessel as the bicarbonate solution flows into the vessel;

wherein the upgrading operation comprises receiving wash water from the wash water reservoir into one vessel of the at least one vessel, the wash water flowing through the anionic bed and exchanging impurity anions from the wash water with bicarbonate ions within the anion exchange resin and creating an upgraded wash water having a lower concentration of impurity anions than the wash water, the upgraded wash water flowing from the vessel to the wash water reservoir as the wash water flows into the vessel from the wash water reservoir;

wherein the cleaning operation comprises receiving input water from the replacement water source into one vessel of the at least one vessel, the input water flowing through the anionic bed and exchanging impurity anions from the input water with bicarbonate ions within the anion exchange resin and creating a cleansed input water having a lower concentration of impurity anions than the input water, the cleansed input water flowing from the vessel to the wash water reservoir as the input water flows into the vessel from the replacement water source.

13. The method of claim 12:
wherein the anion reduction subsystem further comprises a driver coupled to the anion bed of each of the at least one vessel;
wherein the at least one vessel is three vessels;
wherein, for at least a majority of the cycle, the upgrading operation is performed in a first vessel of the three vessels while the cleaning operation is performed in a second vessel of the three vessels and the conditioning operation is performed in a third vessel of the three vessels; and
wherein the method further comprises moving the three anionic beds with the driver upon completion of the cycle, shifting the anionic bed of the first vessel to the interior of the second vessel, the anionic bed of the second vessel to the interior of the third vessel, and the anionic bed of the third vessel to the interior of the first vessel.

14. The method of claim 13 wherein the flow rate of each operation results in the conditioning, upgrading, and cleaning operations each having a duration that is equal.

15. The method of claim 13, wherein the cycle has a duration no greater than a duration of the upgrading operation.

16. The method of claim 12, wherein the flow rate of the cleaning operation is substantially similar to a demand for replacement water in the wash water reservoir.

17. The method of claim 12, further comprising:
receiving a saline wash water from the wash water reservoir at a first desalination rate;
reducing the salinity of the saline wash water to generate a reduced salinity wash water, the reducing salinity comprising at least one of:
    applying reverse osmosis to generate a purified water and a concentrated brine, the purified water being sent to the wash water reservoir and the concentrated brine being one of sent to the anion reduction subsystem and further desalinated;
    precipitating an alkali bicarbonate solid through temperature reduction;
    removing excess cations through cationic exchange using a first cation exchange resin, the first cation exchange resin being regenerated using an acid solution; and
sending the reduced salinity wash water to the wash water reservoir.

18. The method of claim 17, further comprising:
receiving a saline input water from the replacement water source at a second desalination rate;
reducing the salinity of the saline input water to generate a reduced salinity input water, the reducing salinity comprising at least one of:
    applying reverse osmosis to generate a purified water and a concentrated brine, the purified water being sent to the anion reduction subsystem and the concentrated brine being one of sent to the anion reduction subsystem and further desalinated;
    precipitating an alkali bicarbonate solid through temperature reduction;
    removing excess cations through cationic exchange using a first cation exchange resin, the first cation exchange resin being regenerated using an acid solution; and
sending the reduced salinity input water to the anion reduction subsystem.

19. The method of claim 18, wherein reducing the salinity comprises first applying reverse osmosis, then one of precipitating an alkali bicarbonate solid and removing excess cations, followed by the other of precipitating an alkali bicarbonate solid and removing excess cations.

20. The method of claim 18, further comprising:
reducing the concentration of divalent cations, said reduction comprising:
receiving an input hard water from one of the wash water reservoir and the input water source;
scavenging divalent ions from the hard water using a second cation exchange resin to produce a soft water and a bicarbonate waste solution; and
sending the soft water to one of the wash water reservoir and the anion reduction subsystem;
at least one divalent reduction subsystem, each of the at least one divalent reduction subsystem comprising a hard water input in fluid communication with one of the wash water reservoir and the input water source, a soft water output in fluid communication with one of the wash water reservoir and the anion reduction subsystem, and a softening bed comprising a second cation exchange resin that scavenges divalent ions from a hard water received through the hard water input and produces a soft water that is provided through the soft water output;
wherein the second cation exchange resin is regenerated using an alkali bicarbonate solution, creating a waste solution.

\* \* \* \* \*